(12) United States Patent
Tsai et al.

(10) Patent No.: US 12,411,474 B2
(45) Date of Patent: Sep. 9, 2025

(54) INTEGRATED CIRCUIT CONFIGURABLE TO PERFORM ADAPTIVE THERMAL CEILING CONTROL IN PER-FUNCTIONAL-BLOCK MANNER, ASSOCIATED MAIN CIRCUIT, ASSOCIATED ELECTRONIC DEVICE AND ASSOCIATED THERMAL CONTROL METHOD

(71) Applicant: MEDIATEK INC., Hsin-Chu (TW)

(72) Inventors: Chih-Fu Tsai, Hsinchu (TW); Yu-Chia Chang, Hsinchu (TW); Bo-Jiun Yang, Hsinchu (TW); Yen-Hwei Hsieh, Hsinchu (TW); Shun-Yao Yang, Hsinchu (TW); Jia-Wei Fang, Hsinchu (TW); Ta-Chang Liao, Hsinchu (TW); Tai-Yu Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 339 days.

(21) Appl. No.: 17/993,853

(22) Filed: Nov. 23, 2022

(65) Prior Publication Data

US 2023/0185280 A1 Jun. 15, 2023

Related U.S. Application Data

(60) Provisional application No. 63/288,682, filed on Dec. 13, 2021.

(51) Int. Cl.
*G05B 19/4155* (2006.01)
(52) U.S. Cl.
CPC ............ *G05B 19/4155* (2013.01); *G05B 2219/50333* (2013.01)

(58) Field of Classification Search
CPC ................ G05B 2219/50333; G06F 1/206
See application file for complete search history.

(56) References Cited

U.S. PATENT DOCUMENTS 5,526,229 A * 6/1996 Wakabayashi ........... B41J 29/00
361/702
5,805,403 A * 9/1998 Chemla .................. G06F 1/206
702/132

(Continued)

FOREIGN PATENT DOCUMENTS

TW         200702967           1/2007
TW         201631734 A         9/2016

(Continued)

*Primary Examiner* — Incent H Tran
(74) *Attorney, Agent, or Firm* — Winston Hsu

(57) ABSTRACT

An integrated circuit (IC) configurable to perform adaptive thermal ceiling control in a per-functional-block manner, an associated main circuit, an associated electronic device and an associated thermal control method are provided. The IC may include a plurality of hardware circuits arranged to perform operations of a first functional block, and at least one thermal control circuit. At least one temperature sensor is coupled with the first functional block to detect temperature and to generate at least one temperature sensing result of the first functional block. The thermal control circuit performs thermal control on the first functional block to prevent the first functional block from overheating and inducing abnormal function operations, by monitoring the temperature sensing result and by trying to prevent the temperature sensing result from exceeding first temperature upper-limit, wherein the first temperature upper-limit is configurable with respect to per-functional-block thermal operation capability of the first functional block.

26 Claims, 15 Drawing Sheets

(56) References Cited

U.S. PATENT DOCUMENTS

| | | | |
|---|---|---|---|
| 11,086,385 B2* | 8/2021 | Lee | G06F 1/3206 |
| 2005/0040810 A1* | 2/2005 | Poirier | G01R 31/2884 |
| | | | 257/E23.08 |
| 2005/0054125 A1* | 3/2005 | Ku | G01R 31/2856 |
| | | | 219/209 |
| 2005/0278555 A1* | 12/2005 | Chaparro | G06F 1/206 |
| | | | 712/E9.071 |
| 2005/0283561 A1* | 12/2005 | Lee | G06F 1/324 |
| | | | 710/307 |
| 2006/0095911 A1* | 5/2006 | Uemura | G06F 9/5027 |
| | | | 718/100 |
| 2007/0215341 A1* | 9/2007 | Urita | G06F 1/206 |
| | | | 165/287 |
| 2011/0191602 A1* | 8/2011 | Bearden | G06F 1/206 |
| | | | 713/300 |
| 2011/0265090 A1* | 10/2011 | Moyer | G06F 1/3203 |
| | | | 707/812 |
| 2012/0036398 A1* | 2/2012 | Moyer | G06F 9/505 |
| | | | 714/48 |
| 2012/0159216 A1* | 6/2012 | Wells | G06F 1/26 |
| | | | 713/320 |
| 2012/0166839 A1* | 6/2012 | Sodhi | G06F 1/3206 |
| | | | 713/324 |
| 2013/0285687 A1* | 10/2013 | Chakraborty | G01R 31/2875 |
| | | | 324/750.05 |
| 2015/0028337 A1 | 1/2015 | Kartal | |
| 2015/0143142 A1* | 5/2015 | Park | G06F 9/44505 |
| | | | 713/320 |
| 2015/0241887 A1 | 8/2015 | Brower | |
| 2016/0147291 A1* | 5/2016 | Thomas | G06F 1/324 |
| | | | 713/320 |
| 2017/0177044 A1* | 6/2017 | Limaye | G06F 1/324 |
| 2018/0209750 A1* | 7/2018 | Im | G06F 1/206 |
| 2018/0217653 A1* | 8/2018 | Zhang | G06F 9/50 |
| 2019/0188053 A1* | 6/2019 | Benke | G06F 11/3024 |
| 2021/0110866 A1* | 4/2021 | Gopalakrishnan | |
| | | | G06F 12/0246 |
| 2021/0182066 A1* | 6/2021 | Shenoy | G06F 1/28 |
| 2022/0165191 A1* | 5/2022 | Yao | G09G 5/006 |
| 2023/0031415 A1* | 2/2023 | Rajwan | G06F 11/3058 |
| 2023/0106101 A1* | 4/2023 | Zhao | G11C 16/3418 |
| | | | 700/300 |
| 2023/0176634 A1* | 6/2023 | Winkler | G06F 1/3296 |
| | | | 700/300 |
| 2024/0315569 A1* | 9/2024 | Qi | G01K 1/16 |

FOREIGN PATENT DOCUMENTS

| | | |
|---|---|---|
| TW | 201827972 A | 8/2018 |
| TW | 202108995 A | 3/2021 |
| TW | 202125142 A | 7/2021 |
| WO | 2013/111863 A1 | 8/2013 |

* cited by examiner

INTEGRATED CIRCUIT CONFIGURABLE TO PERFORM ADAPTIVE THERMAL CEILING CONTROL IN PER-FUNCTIONAL-BLOCK MANNER, ASSOCIATED MAIN CIRCUIT, ASSOCIATED ELECTRONIC DEVICE AND ASSOCIATED THERMAL CONTROL METHOD

CROSS REFERENCE TO RELATED APPLICATIONS

This application claims the benefit of U.S. Provisional Application No. 63/288,682, filed on Dec. 13, 2021. The content of the application is incorporated herein by reference.

BACKGROUND

The present invention is related to circuit design, and more particularly, to an integrated circuit (IC) configurable to perform adaptive thermal ceiling control in a per-functional-block manner, an associated main circuit, an associated electronic device and an associated thermal control method.

According to the related art, a control circuit in an electronic device can be implemented by way of IC fabrication. For example, a design house can design a circuit such as the control circuit according to some design rules, and the manufacturing process can be performed in one or more highly specialized semiconductor fabrication plants, which can be referred to as foundries or fabs. In addition, a system running on the control circuit can be designed to operate according to a maximum thermal balance point such as a throttle point, in order to gain better performance while preventing the system from entering an overheated state and inducing a system reboot or abnormal operation. However, some problems may occur. The maximum thermal balance point such as the throttle point is typically a fixed throttle point based on pre-silicon worst case analysis, and the pre-silicon worst case analysis limits the system performance pessimistically, where the fixed throttle point has been determined according to the pre-silicon worst case analysis in advance before a mass production phase of the IC. Thus, there is a need for a novel method and associated architecture to further enhance the system performance without introducing a side effect or in a way that is less likely to introduce a side effect.

SUMMARY

It is an objective of the present invention to provide an IC configurable to perform adaptive thermal ceiling control in a per-functional-block manner, an associated main circuit, an associated electronic device and an associated thermal control method, in order to solve the above-mentioned problems.

At least one embodiment of the present invention provides an IC that is configurable to perform adaptive thermal ceiling control in a per-functional-block manner. For example, the IC may comprise a plurality of hardware circuits arranged to perform operations of a first functional block, and at least one thermal control circuit that is coupled to the first functional block. In addition, the plurality of hardware circuits can be arranged to perform operations of the first functional block, and at least one temperature sensor can be coupled with the first functional block to detect temperature and to generate at least one temperature sensing result of the first functional block. Additionally, the aforementioned at least one thermal control circuit can be arranged to perform thermal control on the first functional block to prevent the first functional block from overheating and inducing abnormal function operations, by monitoring the at least one temperature sensing result of the first functional block and by trying to prevent the at least one temperature sensing result from exceeding a first temperature upper-limit of the first functional block of the IC, wherein the first temperature upper-limit is configurable with respect to at least one per-functional-block thermal operation capability of the first functional block. According to some embodiments, the IC may comprise a plurality of functional blocks, and the first functional block is a functional block among the plurality of functional blocks.

In addition to the IC mentioned above, the present invention further provides a main circuit comprising the IC, where the first temperature upper-limit can be a first chip-level temperature upper-limit. For example, the main circuit may further comprise at least one other IC and a plurality of board-level temperature sensors. The aforementioned at least one other IC can be arranged to perform at least one other operation for the IC. In addition, the plurality of board-level temperature sensors can be arranged to perform temperature sensing within the main circuit to generate respective temperature sensing results of the IC and the at least one other IC. Additionally, the aforementioned at least one thermal control circuit can be arranged to perform thermal control on the IC and the at least one other IC to prevent the IC and the at least one other IC from overheating and inducing abnormal function operations, by monitoring the respective temperature sensing results of the IC and the at least one other IC and by trying to prevent the respective temperature sensing results of the IC and the at least one other IC from exceeding at least one first board-level temperature upper-limit of the main circuit, wherein the at least one first board-level temperature upper-limit is configurable with respect to at least one per-board thermal operation capability of the main circuit.

In addition to the main circuit mentioned above, the present invention further provides an electronic device comprising the main circuit, where the main circuit can be a main component of the electronic device. For example, the electronic device may further comprise at least one secondary component and a plurality of device-level temperature sensors. The aforementioned at least one secondary component can be arranged to operate under control of the main circuit. In addition, the plurality of device-level temperature sensors can be arranged to perform temperature sensing within the electronic device to generate respective temperature sensing results of the main circuit and the at least one secondary component. Additionally, the aforementioned at least one thermal control circuit can be arranged to perform thermal control on the main circuit and the at least one secondary component to prevent the main circuit and the at least one secondary component from overheating and inducing abnormal function operations, by monitoring the respective temperature sensing results of the main circuit and the at least one secondary component and by trying to prevent the respective temperature sensing results of the main circuit and the at least one secondary component from exceeding at least one first device-level temperature upper-limit of the electronic device, wherein the at least one first device-level temperature upper-limit is configurable with respect to at least one per-device thermal operation capability of the electronic device.

At least one embodiment of the present invention provides a thermal control method that is applicable to at least one functional block of an IC, where the at least one functional block is configurable to perform adaptive thermal ceiling control in a per-functional-block manner. For example, the thermal control method may comprise: utilizing at least one temperature sensor coupled with a first functional block of the at least one functional block of the IC to detect temperature and to generate at least one temperature sensing result of the first functional block; and performing thermal control on the first functional block to prevent the first functional block from overheating and inducing abnormal function operations, by monitoring the at least one temperature sensing result of the first functional block and by trying to prevent the at least one temperature sensing result from exceeding a first temperature upper-limit of the first functional block of the IC, wherein the first temperature upper-limit is configurable with respect to at least one per-functional-block thermal operation capability of the first functional block.

According to some embodiments, the first temperature upper-limit can be implemented as a first chip-level temperature upper-limit. For example, the aforementioned at least one thermal control circuit can be arranged to determine at least one first chip-level temperature upper-limit such as the first chip-level temperature upper-limit mentioned above according to at least one first functional-block-level temperature upper-limit (e.g., one or more one or more first functional-block-level temperature upper-limits). In addition, the aforementioned at least one first chip-level temperature upper-limit can be equal to a minimum of the aforementioned at least one first functional-block-level temperature upper-limit (e.g., the one or more first functional-block-level temperature upper-limits).

It is an advantage of the present invention that, through proper design, the present invention IC, as well as the associated apparatus such as the main circuit, the electronic device, etc., can be equipped with at least one first temperature upper-limit that is configurable with respect to the aforementioned at least one per-functional-block thermal operation capability of the aforementioned at least one functional block, to further enhance the system performance in a per-functional-block manner. For example, among a plurality of IC products of the IC, a batch of IC products (e.g., a first set of IC products, and more particularly, the respective functional blocks of the first set of IC products) may have the aforementioned at least one first temperature upper-limit being configured with respect to the aforementioned at least one per-functional-block thermal operation capability of the aforementioned at least one functional block of the ICs in this batch in order to achieve the maximum performance of this batch, and another batch of IC products (e.g., a second set of IC products, and more particularly, the respective functional blocks of the second set of IC products) may have the aforementioned at least one first temperature upper-limit being configured with respect to the aforementioned at least one per-functional-block thermal operation capability of the aforementioned at least one functional block of the ICs in the other batch in order to achieve the maximum performance of the other batch. In comparison with the related art, the present invention IC, as well as the associated apparatus such as the main circuit, the electronic device, etc., can operate correctly in various situations while achieving the maximum performance, where the aforementioned at least one first temperature upper-limit can be configured with respect to the aforementioned at least one per-functional-block thermal operation capability of the aforementioned at least one functional block of the IC, to make the aforementioned at least one first temperature upper-limit be as high as possible.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
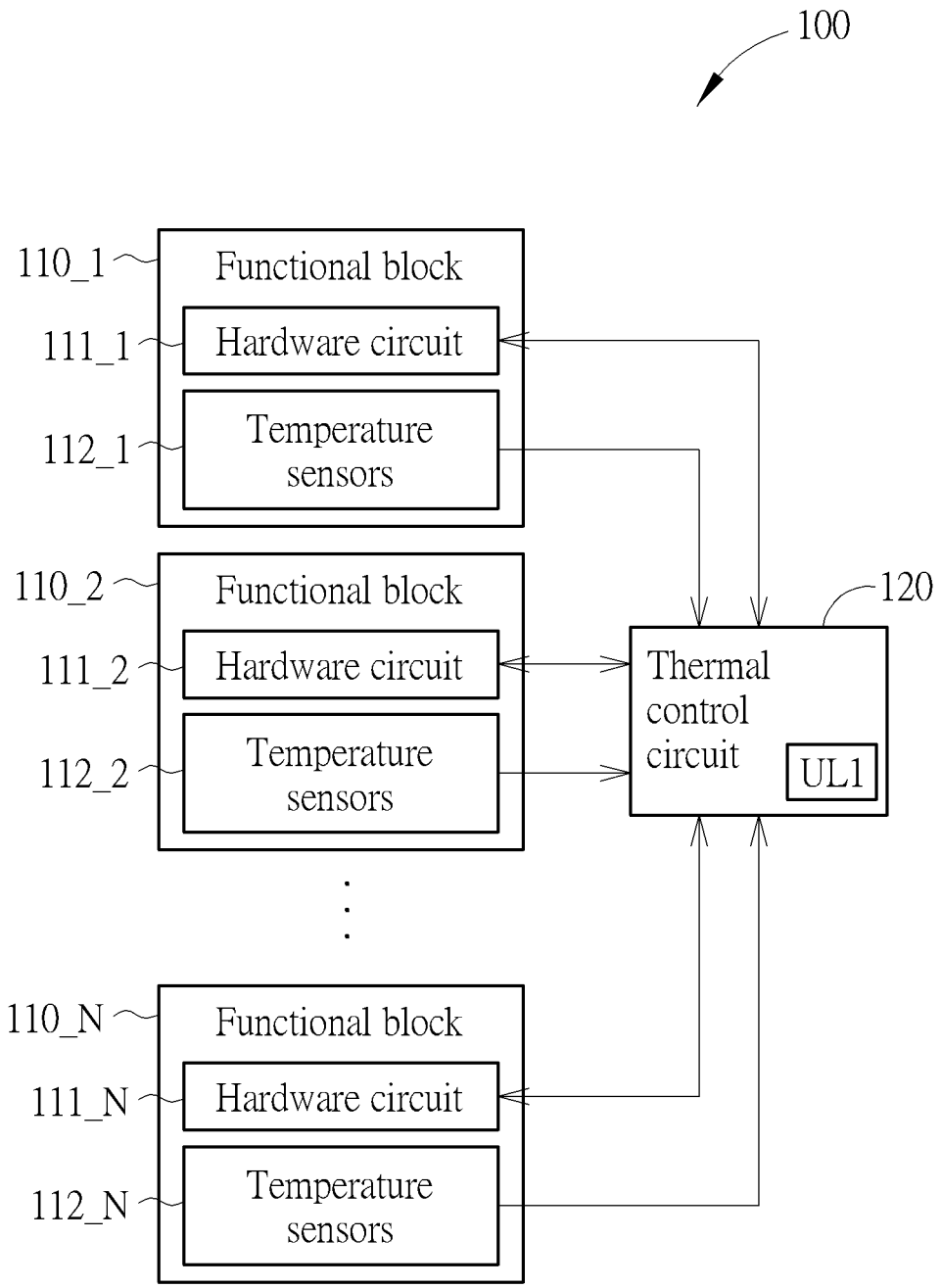
FIG. 1A is a diagram of an IC according to an embodiment of the present invention.

FIG. 1A is a diagram of an IC 100 according to an embodiment of the present invention. The IC 100 may comprise a plurality of functional blocks such as N functional blocks, where the symbol "N" may represent a positive integer that is greater than one. More particular, the plurality of functional blocks such as the N functional blocks may comprise the functional blocks 110_1, 110_2, . . . and 110_N. Examples of the plurality of functional blocks may include, but are not limited to: a micro-processor (microprocessor) such as a central processing unit (CPU), a graphic processing unit (GPU), an accelerated processing unit (APU) and a modulator-demodulator (Modem). In addition to the functional blocks 110_1, 110_2, . . . and 110_N, the IC 100 may further comprise at least one thermal control circuit (e.g., one or more thermal control circuits), which may be collectively referred to as the thermal control circuit 120. For better comprehension, the IC 100 may represent a control circuit in an electronic device, and more particularly, may represent a processing circuit comprising at least one processor/microprocessor, etc., but the present invention is not limited thereto.

The IC 100 may comprise one or more temperature sensors that are integrated with any of the functional blocks 110_1, 110_2, . . . and 110_N, and more particularly, may comprise a plurality of temperature sensors that are respectively integrated with (e.g., next to or into) the functional blocks 110_1, 110_2, . . . and 110_N, and therefore any temperature sensor among the plurality of temperature sensors may be positioned next to or within a sub-region of a layout region of one functional block among the functional blocks 110_1, 110_2, . . . and 110_N. For better comprehension, any functional block 110_n (e.g., the symbol "n" may represent an integer falling within the interval [1, N]) among the functional blocks 110_1, 110_2, . . . and 110_N may comprise a plurality of hardware circuits 111_n, such as the original internal hardware circuits of the aforementioned any functional block 110_n before any temperature sensor among the plurality of temperature sensors is integrated with (e.g., next to or into) the aforementioned any functional block 110_n, and may further comprise at least one temperature sensor (e.g., temperature sensors), which can be collectively referred as the one or more temperature sensors 112_n. As shown in FIG. 1A, the functional block 110_1 comprises the hardware circuits 111_1 and the one or more temperature sensors 112_1, the functional block 110_2 comprises the hardware circuits 111_2 and the one or more temperature sensors 112_2, and the rest can be deduced by analogy, for example, the functional block 110_N comprises the hardware circuits 111_N and the one or more temperature sensors 112_N. For example, the functional block 110_1 may represent the CPU. In this situation, the hardware circuits 111_1 of the functional block 110_1 may comprise the CPU positioned within a main sub-region of a layout region of the functional block 110_1, such as the original internal hardware circuits of the functional block 110_1 before the one or more temperature sensors 112_1 are integrated with (e.g., next to or into) the functional block 110_1, where any temperature sensor among the one or more temperature sensors 112_1 may be positioned within or outside the main sub-region of the layout region of the functional block 110_1, and more particularly, may be positioned next to the main sub-region of the layout region of the functional block 110_1 and/or positioned within any remaining sub-region among at least one remaining sub-region (e.g., one or more remaining sub-regions) of the layout region of the functional block 110_1. For another example, the functional block 110_2 may represent the GPU. In this situation, the hardware circuits 111_2 of the functional block 110_2 may comprise the GPU positioned within a main sub-region of a layout region of the functional block 110_2, such as the original internal hardware circuits of the functional block 110_2 before the one or more temperature sensors 112_2 are integrated with (e.g., next to or into) the functional block 110_2, where any temperature sensor among the one or more temperature sensors 112_2 may be positioned within or outside the main sub-region of the layout region of the functional block 110_2, and more particularly, may be positioned next to the main sub-region of the layout region of the functional block 110_2 and/or positioned within any remaining sub-region among at least one remaining sub-region (e.g., one or more remaining sub-regions) of the layout region of the functional block 110_2.

The IC 100 is configurable to perform adaptive thermal ceiling control in a per-functional-block manner. The hardware circuits 111_n can be arranged to perform operations of the functional block 111_n, and the one or more temperature sensors 112_n can be arranged to perform temperature sensing related to the functional block 110_n to generate at least one temperature sensing result (e.g., one or more temperature sensing results) of the functional block 110_n. In addition, the thermal control circuit 120 can be arranged to perform thermal control on the plurality of functional blocks such as the functional blocks 110_1, 110_2, . . . and 110_N, and more particularly, perform thermal control on the functional block 110_n to prevent the functional block 110_n from overheating and inducing abnormal function operations, by monitoring the aforementioned at least one temperature sensing result of the functional block 110_n and by trying to prevent the aforementioned at least one temperature sensing result of the functional block 110_n from exceeding a first temperature upper-limit UL1 of the functional block 110_n among at least one first temperature upper-limit UL1 (e.g., one or more first temperature upper-limits {UL1}) of the functional blocks 110_1, 110_2, . . . and 110_N, such as one of a plurality of first temperature upper-limits {UL1} of the functional blocks 110_1, 110_2, . . . and 110_N, where the first temperature upper-limit UL1 of the functional block 110_n is configurable with respect to at least one per-functional-block thermal operation capability (e.g., one or more per-functional-block thermal operation capabilities) of the aforementioned any functional block 110_n among the functional blocks 110_1, 110_2, . . . and 110_N within IC 100, and more particularly, the plurality of first temperature upper-limits {UL1} are configurable with respect to the aforementioned at least one per-functional-block thermal operation capability (e.g., the one or more per-functional-block thermal operation capabilities) such as the per-functional-block thermal operation capabilities of the functional blocks 110_1, 110_2, . . . and 110_N within IC 100, respectively. For better comprehension, the plurality of first temperature upper-limits {UL1} may represent a plurality of thermal ceiling target values of the functional blocks 110_1, 110_2, . . . and 110_N for preventing the functional blocks 110_1, 110_2, . . . and 110_N from overheating, respectively, and the aforementioned at least one first temperature upper-limit UL1 may represent a thermal ceiling target value of the functional blocks 110_1, 110_2, . . . and 110_N for preventing the functional blocks 110_1, 110_2, . . . and 110_N from overheating. For example, the thermal control circuit 120 can be arranged to perform thermal control on the functional blocks 110_1, 110_2, . . . and 110_N (e.g., control the respective power consumption of the functional blocks 110_1, 110_2, . . . and 110_N) to prevent the functional blocks 110_1, 110_2, . . . and 110_N from overheating and inducing abnormal function operations, by monitoring the temperature sensing result(s) of each functional block (e.g., the aforementioned at least one temperature sensing result of the functional block 110_n) and by trying to prevent the temperature sensing result(s) of the aforementioned each functional block from exceeding the functional block specific first temperature upper-limit UL1 (e.g., the first temperature upper-limit UL1_n corresponding to the functional block 110_n among the plurality of first temperature upper-limits {UL1}) in a time interval between a beginning time point of boot-up of the IC 100 and an end time point of shutdown of the IC 100. Examples of the aforementioned at least one per-functional-block thermal operation capability may include, but are not limited to: a power-to-thermal efficiency of the functional block 110_n, a maximum voltage budget of the functional block 110_n, a maximum power budget of the functional block 110_n, a thermal control efficiency of the functional block 110_n, an operation power efficiency regarding temperature level of the functional block 110_n, and a reliability budget of the functional block 110_n.

According to some embodiments, the aforementioned at least one per-functional-block thermal operation capability may comprise one or a combination of the power-to-thermal efficiency of the functional block 110_n, the maximum voltage budget of the functional block 110_n, the maximum power budget of the functional block 110_n, the thermal control efficiency of the functional block 110_n, the operation power efficiency regarding temperature level of the functional block 110_n and the reliability budget of the functional block 110_n.

Figure 1B:
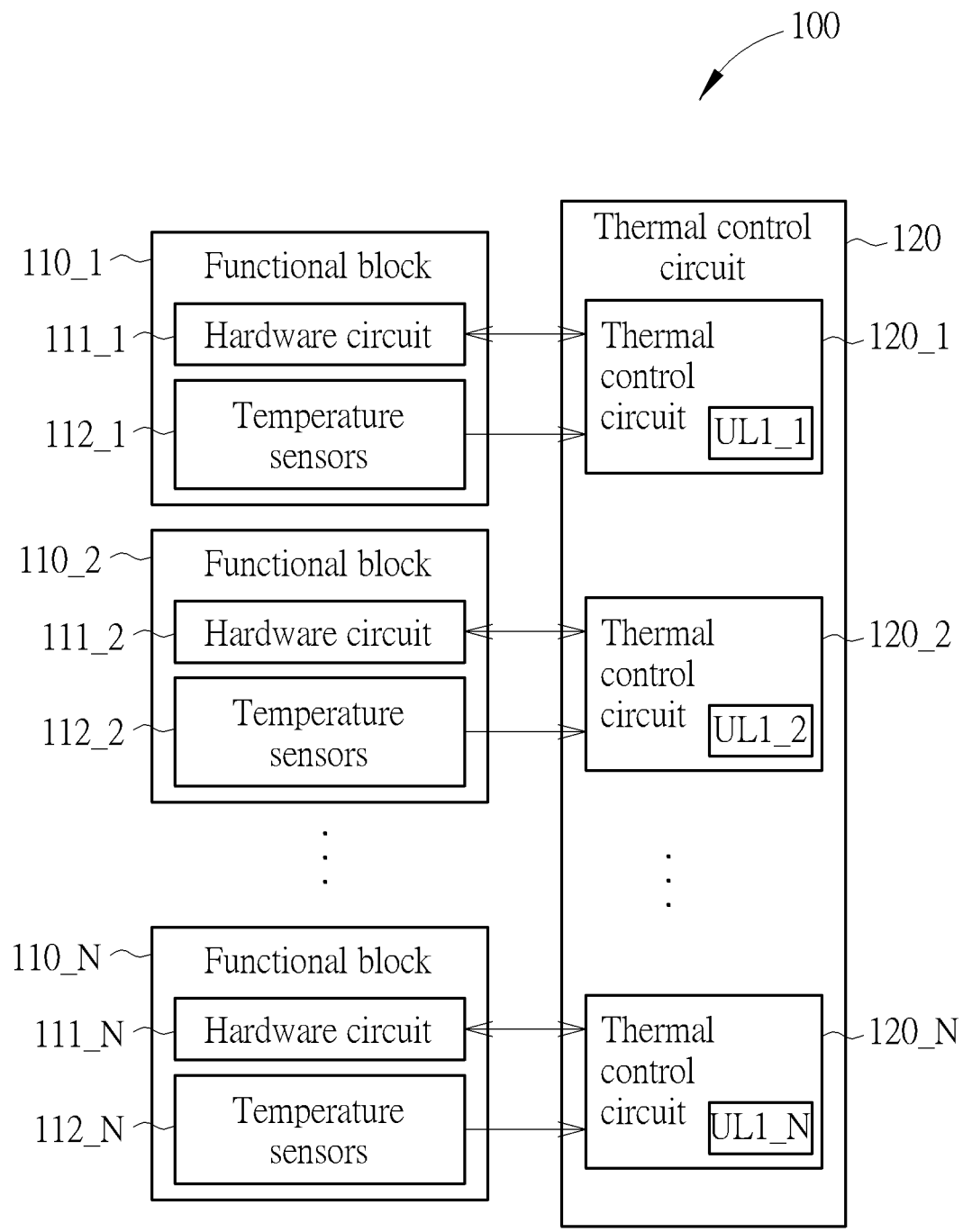
FIG. 1B is a diagram illustrating some implementation details of the IC shown in FIG. 1A according to an embodiment of the present invention.

FIG. 1B is a diagram illustrating some implementation details of the IC shown in FIG. 1A according to an embodiment of the present invention. For better comprehension, the aforementioned at least one thermal control circuit such as the thermal control circuit 120 may comprise a plurality of thermal control circuits such as the thermal control circuits 120_1, 120_2, . . . and 120_N respectively corresponding to the functional blocks 110_1, 110_2, . . . and 110_N, but the present invention is not limited thereto. In addition, the thermal control circuits 120_1, 120_2, . . . and 120_N can be arranged to perform thermal control on the functional blocks 110_1, 110_2, . . . and 110_N (e.g., control the power consumption of the functional blocks 110_1, 110_2, . . . and 110_N), respectively, to prevent the functional blocks 110_1, 110_2, . . . and 110_N from overheating and inducing abnormal function operations, by monitoring the respective temperature sensing results of the functional blocks 110_1, 110_2, . . . and 110_N and by trying to prevent the respective temperature sensing results of the functional blocks 110_1, 110_2, . . . and 110_N from exceeding the first temperature upper-limits UL1_1, UL1_2, . . . and UL1_N corresponding to the functional blocks 110_1, 110_2, . . . and 110_N among the plurality of first temperature upper-limits {UL1} in the time interval between the beginning time point of boot-up of the IC 100 and the end time point of shutdown of the IC 100, respectively. For brevity, similar descriptions for this embodiment are not repeated in detail here.

Figure 2:
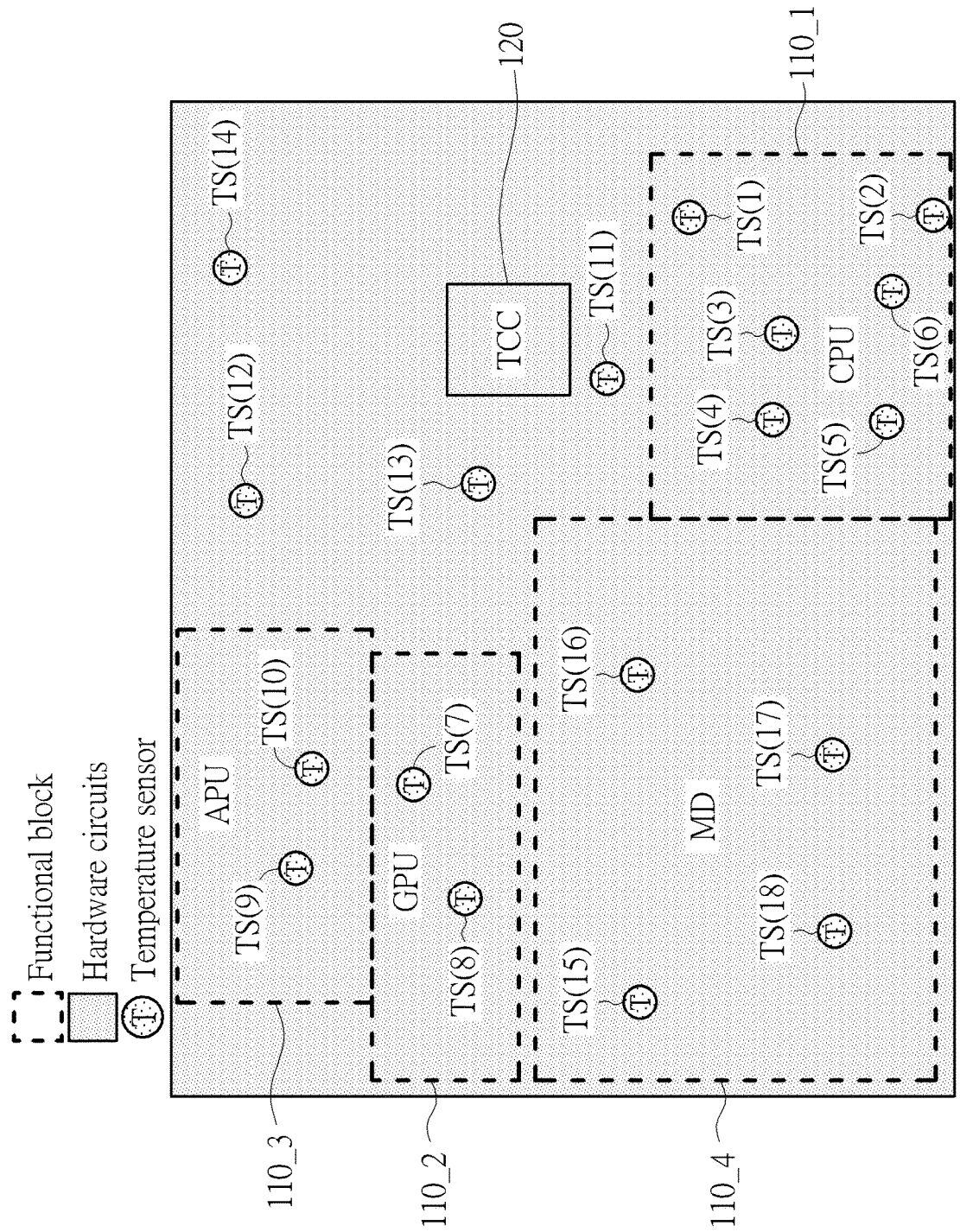
FIG. 2 is a diagram illustrating a system on chip (SoC) thermal control scheme of a thermal control method applicable to an IC such as the IC shown in FIG. 1A according to an embodiment of the present invention.

FIG. 2 is a diagram illustrating a system on chip (SoC) thermal control scheme of a thermal control method applicable to an IC such as the IC 100 shown in FIG. 1A (e.g., at least one functional block among the functional blocks 110_1, 110_2, . . . and 110_N thereof) according to an embodiment of the present invention. For example, the functional block count N of the functional blocks 110_1, 110_2, . . . and 110_N may be greater than or equal to one. For better comprehension, the functional blocks 110_1, 110_2, 110_3 and 110_4 may be illustrated as shown in FIG. 2, but the present invention is not limited thereto. In this situation, the functional blocks 110_1, 110_2, 110_3 and 110_4 may represent the CPU, the GPU, the APU and the Modem (labeled "MD" for brevity), and the hardware circuits 111_1, 111_2, etc. of the functional blocks 110_1, 110_2, etc. may comprise the CPU, the GPU, etc. positioned within the main sub-regions of the layout regions of the functional blocks 110_1, 110_2, etc., respectively, such as the original internal hardware circuits of the functional blocks 110_1, 110_2, etc. before the temperature sensors 112_1, 112_2, etc. are integrated with (e.g., next to or into) the functional blocks 110_1, 110_2, etc., respectively, where the temperature sensors 112_1, 112_2, etc. may be positioned within or outside the main sub-regions of the layout regions of the functional blocks 110_1, 110_2, etc., respectively, and more particularly, may be positioned next to the main sub-regions of the layout regions of the functional blocks 110_1, 110_2, etc. and/or positioned within the remaining sub-regions of the layout regions of the functional blocks 110_1, 110_2, etc., respectively.

For better comprehension, the plurality of temperature sensors may comprise multiple sets of temperature sensors (labeled "T" for brevity) that are respectively integrated with (e.g., next to or into) the functional blocks 110_1, 110_2, etc., such as a first set of temperature sensors {TS(1), TS(2), TS(3), TS(4), TS(5), TS(6)} integrated into the functional block 110_1, a second set of temperature sensors {TS(7), TS(8)} integrated into the functional block 110_2, a third set of temperature sensors {TS(9), TS(10)} integrated into the functional block 110_3, a fourth set of temperature sensors {TS(15), TS(16), TS(17), TS(18)} integrated into the functional block 110_4, and at least one set of other temperature sensors {TS(11), TS(12), TS(13), TS(14)} integrated with (e.g., next to or into) at least one other functional block, but the present invention is not limited thereto. In addition, the aforementioned at least one thermal control circuit such as the thermal control circuit 120 may be implemented by way of hardware and/or software, such as pure hardware or at least one hybrid module (e.g., one or more hybrid modules) of hardware and software, and may be implemented as a single thermal control circuit (labeled "TCC" for brevity) for collecting the temperature sensing results of all functional blocks among the functional blocks 110_1, 110_2, etc. and controlling the functional blocks 110_1, 110_2, etc. in a centralized temperature-sensing and thermal control architecture, or may be implemented as the plurality of thermal control circuits such as the thermal control circuits 120_1, 120_2, etc. respectively corresponding to the functional blocks 110_1, 110_2, etc. for collecting the temperature sensing results of the thermal control circuits 120_1, 120_2, etc. and controlling the functional blocks 110_1, 110_2, etc. in a distributed temperature-sensing and thermal control architecture, respectively. For brevity, similar descriptions for this embodiment are not repeated in detail here.

According to some embodiments, the thermal control circuit 120_n corresponding to the functional block 110_n may be integrated with (e.g., next to or into) the functional block 110_n, but the present invention is not limited thereto. In addition, the one or more temperature sensors 112_n that are integrated with (e.g., next to or into) the functional block 110_n may be integrated with (e.g., next to or into) the thermal control circuit 120_n corresponding to the functional block 110_n. For brevity, similar descriptions for these embodiments are not repeated in detail here.

According to some embodiments, the thermal control circuit 120 may be integrated with (e.g., next to or into) a certain functional block among the functional blocks 110_1, 110_2, ... and 110_N, such as the functional block 110_1 (e.g., the CPU). For brevity, similar descriptions for these embodiments are not repeated in detail here.

According to some embodiments, before the aforementioned at least one first temperature upper-limit UL1 is determined, some other temperature upper-limits, such as at least one second temperature upper-limit UL2 (e.g., one or more second temperature upper-limits {UL2}), at least one third temperature upper-limit UL3 (e.g., one or more third temperature upper-limits {UL3}), and a fourth temperature upper-limit UL4, typically need to be determined in advance, but the present invention is not limited thereto. For example, before the aforementioned at least one first temperature upper-limit UL1 of the aforementioned at least one functional block (e.g., one or more functional blocks, such as a portion of functional blocks or all functional blocks among the functional blocks 110_1, 110_2, ... and 110_N) is determined, some other temperature upper-limits of the aforementioned at least one functional block, such as the aforementioned at least one second temperature upper-limit UL2 of the aforementioned at least one functional block, the aforementioned at least one third temperature upper-limit UL3 of the aforementioned at least one functional block, and the fourth temperature upper-limit UL4, typically need to be determined in advance, where the aforementioned at least one second temperature upper-limit UL2 of the aforementioned at least one functional block and the aforementioned at least one third temperature upper-limit UL3 of the aforementioned at least one functional block can be determined according to a first per-functional-block thermal-sensor-related feature and a second per-functional-block thermal-sensor-related feature, respectively, and the first per-functional-block thermal-sensor-related feature and the second per-functional-block thermal-sensor-related feature can be selected from a set of predetermined per-functional-block thermal-sensor-related features (e.g., the per-functional-block thermal sensor accuracy and the per-functional-block thermal-sensor detection tolerance).

Figure 3:
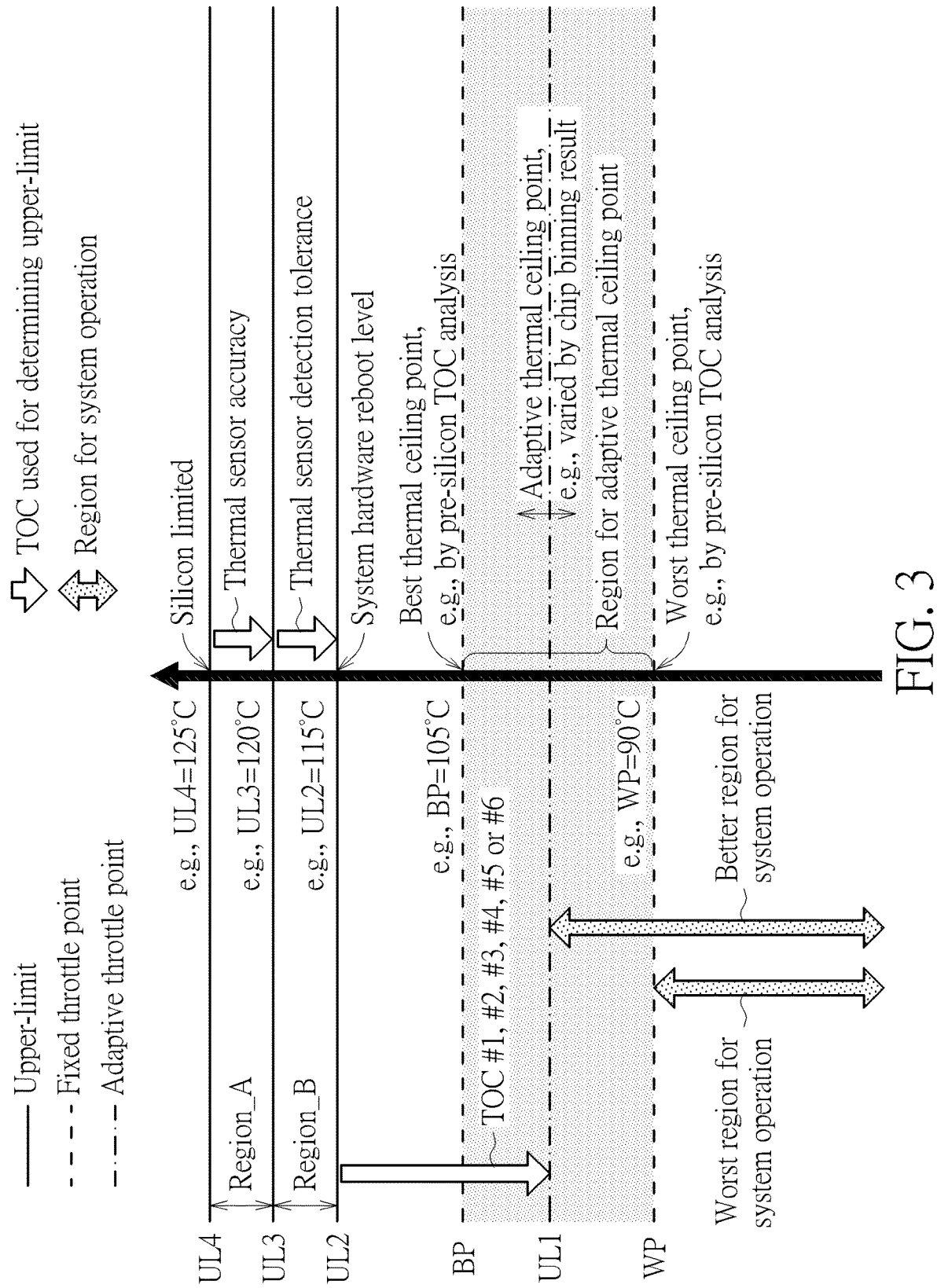
FIG. 3 is a diagram illustrating an adaptive thermal ceiling point control scheme of the thermal control method according to an embodiment of the present invention.

FIG. 3 is a diagram illustrating an adaptive thermal ceiling point control scheme of the thermal control method according to an embodiment of the present invention. For better comprehension, taking the aforementioned any functional block 110_n as an example of the aforementioned at least one functional block, before the first temperature upper-limit UL1 of the functional block 110_n is determined, some other temperature upper-limits (labeled "Upper-limit" for brevity) of the functional block 110_n, such as the second temperature upper-limit UL2 of the functional block 110_n, the third temperature upper-limit UL3 of the functional block 110_n, and the fourth temperature upper-limit UL4, typically need to be determined in advance, where the second temperature upper-limit UL2 and the third temperature upper-limit UL3 can be determined according to the first per-functional-block thermal-sensor-related feature and the second per-functional-block thermal-sensor-related feature, respectively. For example, the fourth temperature upper-limit UL4 can be a silicon limited temperature upper-limit (labeled "Silicon limited" for brevity) that is defined by the fabrication conditions which provided by a fabricator of the IC 100 (e.g., a certain foundry or fab among the aforementioned foundries or fabs), such as a strictly forbidden upper-limit defined by the fabricator of the IC 100 to guarantee the function operation normally based on fabrication condition, and can be determined as 125° C. (labeled "UL4=125° C." for brevity) first as an example, and then the third temperature upper-limit UL3 of the functional block 110_n can be determined as 120° C. (labeled "UL3=120° C." for brevity) according to the second per-functional-block thermal-sensor-related feature such as the per-functional-block thermal sensor accuracy (labeled "Thermal sensor accuracy" for brevity), and the second temperature upper-limit UL2 of the functional block 110_n can be determined as 115° C. (labeled "UL2=115° C." for brevity) according to the first per-functional-block thermal-sensor-related feature such as the per-functional-block thermal-sensor detection tolerance (labeled "Thermal sensor detection tolerance" for brevity) afterward, where the second temperature upper-limit UL2 can be a system hardware reboot level of the functional block 110_n to secure function operation normally with temperature reference, but the present invention is not limited thereto. In addition, the best thermal ceiling point BP of the functional block 110_n and the worst thermal ceiling point WP of the functional block 110_n can be determined by silicon design information analysis, for example, by performing at least one pre-silicon thermal operation capability (TOC) analysis before the fabrication of the IC 100 (labeled "by pre-silicon TOC analysis" for brevity). For example, the best thermal ceiling point BP of the functional block 110_n and the worst thermal ceiling point WP of the functional block 110_n can be respectively determined as 105° C. and 90° C. (respectively labeled "BP=105° C." and "WP=90° C." for brevity) with all TOC consideration from silicon design information analysis, but the present invention is not limited thereto. Both of the best thermal ceiling point BP and the worst thermal ceiling point WP can be regarded as fixed throttle points, and the first temperature upper-limit UL1 of the functional block 110_n can be regarded as an adaptive throttle point within the interval [WP, BP] between the worst thermal ceiling point WP and the best thermal ceiling point BP of the functional block 110_n.

In order to determine the first temperature upper-limit UL1 of the functional block 110_n, production operations of the IC 100 can be executed by a production tool on the IC 100, for performing a functions or chip binning flow on the IC 100 to identify the aforementioned at least one per-functional-block thermal operation capability of the aforementioned any functional block 110_n among the functional blocks 110_1, 110_2, ... and 110_N within the IC 100. As a result, the temperature upper-limit UL1 of the functional block 110_n can be determined according to the aforementioned at least one per-functional-block thermal operation capability identified in the functions or chip binning flow. As shown in FIG. 3, the first temperature upper-limit UL1 can be configured as an adaptive thermal ceiling point within a predetermined temperature region (e.g., the interval [WP, BP] between the worst thermal ceiling point WP and the best thermal ceiling point BP) according to the aforementioned at least one per-functional-block thermal operation capability, and the first temperature upper-limit UL1 such as the adaptive thermal ceiling point can be varied by the chip binning result of the functions or chip binning flow. For example, the aforementioned at least one per-functional-block thermal operation capability may comprise any per-functional-block thermal operation capability (labeled "TOC #1, #2, #3, #4, #5 or #6" for brevity) among the following per-functional-block thermal operation capabilities:

(1) TOC #1: the power-to-thermal efficiency of the functional block 110_n of the IC 100;
(2) TOC #2: the maximum voltage budget of the functional block 110_n of the IC 100;
(3) TOC #3: the maximum power budget of the functional block 110_n of the IC 100;
(4) TOC #4: the thermal control efficiency of the functional block 110_n of the IC 100;
(5) TOC #5: the operation power efficiency regarding temperature level of the functional block 110_n of the IC 100; and
(6) TOC #6: the reliability budget of the functional block 110_n of the IC 100; where the aforementioned at least one per-functional-block thermal operation capability can be selected from a plurality of per-functional-block thermal operation capabilities such as TOC #1, TOC #2, TOC #3, TOC #4, TOC #5 and TOC #6.

As shown in the upper left of FIG. 3, the maximum value (e.g., the best thermal ceiling point BP) of the predetermined temperature region (e.g., the interval [WP, BP] between the worst thermal ceiling point WP and the best thermal ceiling point BP) is less than the second temperature upper-limit UL2 of the functional block 110_n. In addition, the second temperature upper-limit UL2 can be determined according to the per-functional-block thermal-sensor detection tolerance, such as the per-functional-block thermal-sensor detection tolerance related to positioning the one or more temperature sensors 112_n integrated with (e.g., next to or into) the functional block 110_n (more particularly, the per-functional-block thermal-sensor detection tolerance related to positioning the plurality of temperature sensors of the IC 100), to make the temperature region Region_B between the second temperature upper-limit UL2 of the functional block 110_n and the third temperature upper-limit UL3 of the functional block 110_n correspond to the per-functional-block thermal-sensor detection tolerance, where the third temperature upper-limit UL3 is typically greater than the second temperature upper-limit UL2, and may represent a temperature upper-limit without considering the per-functional-block thermal-sensor detection tolerance. Additionally, the third temperature upper-limit UL3 can be determined according to the per-functional-block thermal sensor accuracy, such as the per-functional-block thermal sensor accuracy related to at least one temperature-sensing accuracy of the one or more temperature sensors 112_n integrated with (e.g., next to or into) the functional block 110_n (more particularly, the per-functional-block thermal sensor accuracy related to the respective temperature-sensing accuracies of the plurality of temperature sensors of the IC 100), to make the temperature region Region_A between the third temperature upper-limit UL3 of the functional block 110_n and the fourth temperature upper-limit UL4 of the IC 100 correspond to the per-functional-block thermal sensor accuracy, where the fourth temperature upper-limit UL4 is typically greater than the third temperature upper-limit UL3, and may represent a temperature upper-limit without considering the per-functional-block thermal sensor accuracy.

In comparison with any control scheme using the worst thermal ceiling point WP (e.g., the fixed throttle point based on the pre-silicon worst case analysis) as the thermal ceiling point, the adaptive thermal ceiling point control scheme can make the IC 100 (e.g., the aforementioned at least one functional block, such as the functional block 110_n) operate in a better region for system operations, rather than the worst region for system operations, and therefore can significantly enhance the overall performance. For brevity, similar descriptions for this embodiment are not repeated in detail here.

In the embodiment shown in FIG. 3, the per-functional-block thermal-sensor detection tolerance and the per-functional-block thermal sensor accuracy can be taken as examples of the first per-functional-block thermal-sensor-related feature and the second per-functional-block thermal-sensor-related feature, respectively, but the present invention is not limited thereto. According to some embodiments, the per-functional-block thermal sensor accuracy and the per-functional-block thermal-sensor detection tolerance can be taken as examples of the first per-functional-block thermal-sensor-related feature and the second per-functional-block thermal-sensor-related feature, respectively. For brevity, similar descriptions for these embodiments are not repeated in detail here.

According to some embodiments, the aforementioned at least one temperature-sensing accuracy may comprise at least one portion of temperature-sensing accuracies among the respective temperature-sensing accuracies of the respective temperature sensors (e.g., the temperature sensors 112_1, 112_2, . . . and 112_N) of the plurality of functional blocks (e.g., the functional blocks 110_1, 110_2, . . . and 110_N). For example, the aforementioned at least one temperature-sensing accuracy may comprise an average temperature-sensing accuracy of the respective temperature-sensing accuracies of the respective temperature sensors (e.g., the temperature sensors 112_1, 112_2, . . . and 112_N) of the plurality of functional blocks (e.g., the functional blocks 110_1, 110_2, . . . and 110_N). For another example, the aforementioned at least one temperature-sensing accuracy may comprise a statistic temperature-sensing accuracy of the respective temperature-sensing accuracies of the respective temperature sensors (e.g., the temperature sensors 112_1, 112_2, . . . and 112_N) of the plurality of functional blocks (e.g., the functional blocks 110_1, 110_2, . . . and 110_N). For yet another example, the aforementioned at least one temperature-sensing accuracy may comprise a worst temperature-sensing accuracy of the respective temperature-sensing accuracies of the respective temperature sensors (e.g., the temperature sensors 112_1, 112_2, . . . and 112_N) of the plurality of functional blocks (e.g., the functional blocks 110_1, 110_2, . . . and 110_N). For brevity, similar descriptions for these embodiments are not repeated in detail here.

According to some embodiments, based on the adaptive thermal ceiling point control scheme, the thermal operation capability differences between different functional blocks, different chips, and/or different systems can be considered during determining the thermal ceiling point (e.g., the aforementioned at least one first temperature upper-limit UL1), and the performance of the IC 100 will not be hindered by the pessimism constraint of the pre-silicon worst case analysis. More particularly, the adaptive thermal ceiling point control scheme can provide adaptive thermal ceiling to define different throttle points in the per-functional-block and/or per-chip manner based on different thermal operation capabilities of different chips (e.g., the thermal operation capabilities which are characterized from the respective binning results of these chips), for example, by performing the thermal operation capability (TOC) analysis and formulation to get parameters from binning result on silicon to determine a precise throttle point as the aforementioned at least one first temperature upper-limit UL1, to control the overheated risk and get performance boost. For brevity, similar descriptions for these embodiments are not repeated in detail here.

Figure 4:
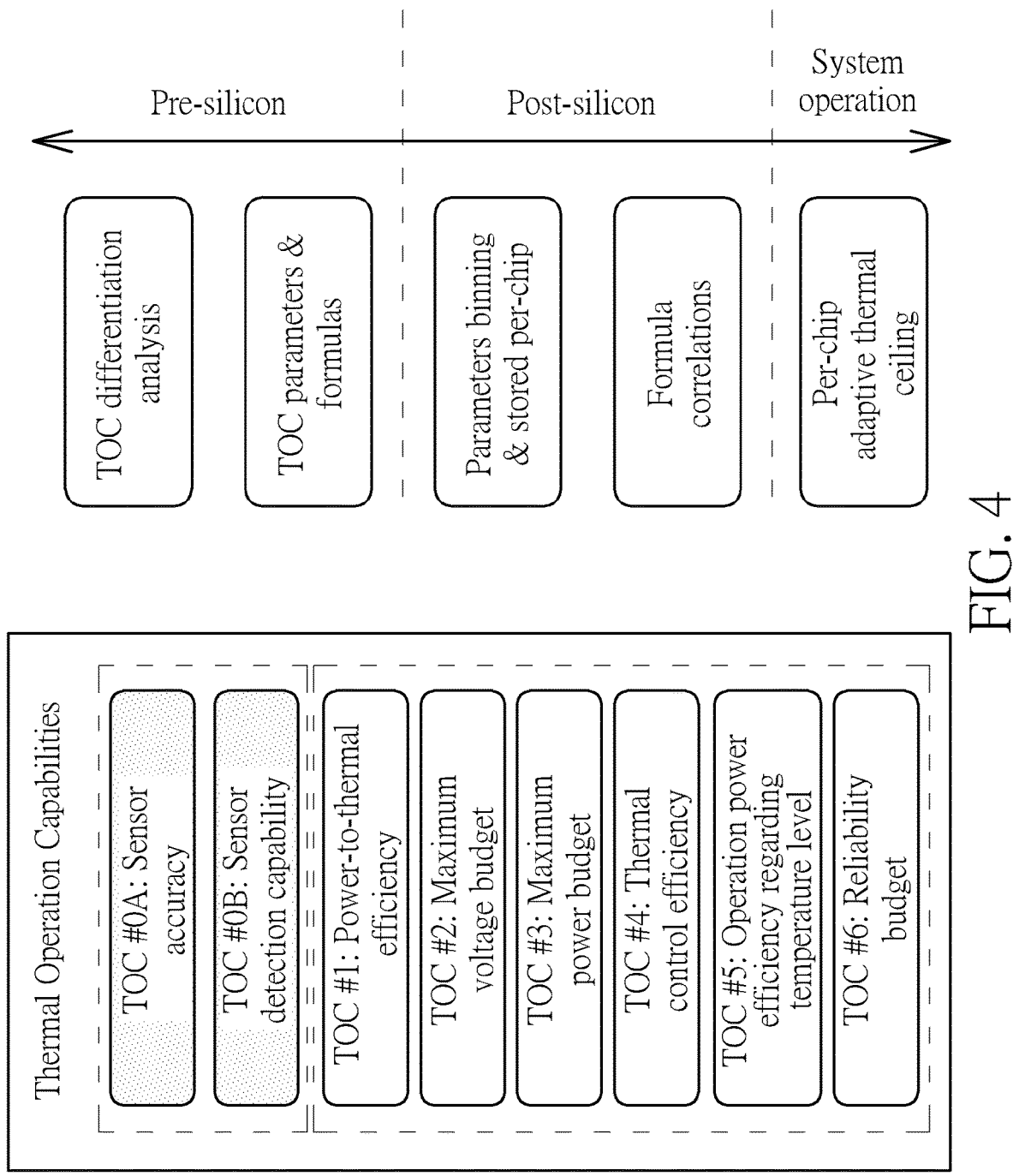
FIG. 4 is a diagram illustrating a per-functional-block adaptive thermal ceiling control scheme of the thermal control method according to an embodiment of the present invention.

FIG. 4 is a diagram illustrating a per-functional-block adaptive thermal ceiling control scheme of the thermal control method according to an embodiment of the present invention. For example, among all thermal operation capabilities regarding the aforementioned at least one functional block (e.g., the functional block 110_n) of the IC 100, the thermal operation capabilities that can be used in any phase among the pre-silicon phase (labeled "Pre-silicon" for brevity), the post-silicon phase (labeled "Post-silicon" for brevity) and the system operation phase (labeled "System operation" for brevity) may comprise:

(0A) TOC #0A: sensor accuracy of the aforementioned at least one functional block (e.g., the functional block 110_n) of the IC 100 (e.g., the thermal sensor accuracy such as the per-functional-block thermal sensor accuracy); and (0B) TOC #013: sensor detection capability of the aforementioned at least one functional block (e.g., the functional block 110_n) of the IC 100 (e.g., the thermal sensor detection tolerance such as the per-functional-block thermal-sensor detection tolerance);

(1) TOC #1: the power-to-thermal efficiency of the aforementioned at least one functional block (e.g., the functional block 110_n) of the IC 100;

(2) TOC #2: the maximum voltage budget of the aforementioned at least one functional block (e.g., the functional block 110_n) of the IC 100;

(3) TOC #3: the maximum power budget of the aforementioned at least one functional block (e.g., the functional block 110_n) of the IC 100;

(4) TOC #4: the thermal control efficiency of the aforementioned at least one functional block (e.g., the functional block 110_n) of the IC 100;

(5) TOC #5: the operation power efficiency regarding temperature level of the aforementioned at least one functional block (e.g., the functional block 110_n) of the IC 100; and (6) TOC #6: the reliability budget of the aforementioned at least one functional block (e.g., the functional block 110_n) of the IC 100;

where the thermal control method can obtain the aforementioned other temperature upper-limits of the aforementioned at least one functional block, such as the aforementioned at least one second temperature upper-limit UL2 (e.g., the second temperature upper-limit UL2 of the functional block 110_n), the aforementioned at least one third temperature upper-limit UL3 (e.g., the third temperature upper-limit UL3 of the functional block 110_n) and the fourth temperature upper-limit UL4, for example, by performing the thermal operation capability (TOC) differentiation analysis and/or determining TOC parameters and formulas, and can provide adaptive thermal ceiling, for example, by performing parameters binning to determine the associated thermal operation capability and store the associated thermal operation capability in the per-functional-block manner (labeled "Parameters binning & stored per-functional-block" for brevity) and by performing formula correlations, but the present invention is not limited thereto.

Based on the per-functional-block adaptive thermal ceiling control scheme, the IC 100 can operate according to the per-functional-block adaptive thermal ceiling such as the aforementioned at least one first temperature upper-limit UL1 of the aforementioned at least one functional block (e.g., the first temperature upper-limit UL1 of the functional block 110_n) in the system operation phase (labeled "System operation" for brevity), to enhance the system performance in the per-functional-block manner. For example, among a plurality of IC products of the IC 100, a batch of IC products (e.g., a first set of IC products, and more particularly, the respective functional blocks of the first set of IC products) may have the aforementioned at least one first temperature upper-limit UL1 being configured with respect to the aforementioned at least one per-functional-block thermal operation capability of the aforementioned at least one functional block of the ICs {100} in this batch in order to achieve the maximum performance of this batch, and another batch of IC products (e.g., a second set of IC products, and more particularly, the respective functional blocks of the second set of IC products) may have the aforementioned at least one first temperature upper-limit UL1 being configured with respect to the aforementioned at least one per-functional-block thermal operation capability of the aforementioned at least one functional block of the ICs {100} in the other batch in order to achieve the maximum performance of the other batch. In comparison with the related art, the IC 100 can operate correctly in various situations while achieving the maximum performance, where the aforementioned at least one first temperature upper-limit UL1 can be configured with respect to the aforementioned at least one per-functional-block thermal operation capability of the aforementioned at least one functional block of the IC 100, to make the aforementioned at least one first temperature upper-limit UL1 be as high as possible. For brevity, similar descriptions for these embodiments are not repeated in detail here.

According to some embodiments, the per-functional-block adaptive thermal ceiling control scheme can enhance the performance target of the aforementioned at least one functional block (e.g., the functional block 110_n) of the IC 100 with accurate thermal operation capability evaluation by using TOC #0A and TOC #0B shown in FIG. 4 as well as at least one TOC (e.g., one or more TOCs, such as all TOCs) among TOC #1, TOC #2, TOC #3, TOC #4, TOC #5 and TOC #6 shown in FIG. 4, where the performance target of the aforementioned at least one functional block (e.g., the functional block 110_n) may represent the target of the performance of the aforementioned at least one functional block (e.g., the functional block 110_n), such as the maximum performance that the aforementioned at least one functional block (e.g., the functional block 110_n) can achieve when the aforementioned at least one functional block (e.g., the functional block 110_n) is operating in the better region for system operations (rather than the worst region for system operations) as shown in the lower left of FIG. 3, but the present invention is not limited thereto. According to some embodiments, the per-functional-block adaptive thermal ceiling control scheme can enhance the performance target of the aforementioned at least one functional block (e.g., the functional block 110_n) with accurate thermal operation capability evaluation by using TOC #0A and TOC #0B as well as the aforementioned at least one TOC (e.g., the one or more TOCs, such as all TOCs) among TOC #1, TOC #2, TOC #3, TOC #4, TOC #5 and TOC #6, and by using at least one multiple software architecture segments adaptive ceiling policy and/or at least one multiple hardware architecture levels adaptive ceiling policy. For example, the per-functional-block adaptive thermal ceiling control scheme can enhance the performance target of the aforementioned at least one functional block (e.g., the functional block 110_n) with accurate thermal operation capability evaluation by using the aforementioned at least one multiple software architecture segments adaptive ceiling policy, and more particularly, apply different thermal ceiling policies in different temperature segments, respectively. For another example, the per-functional-block adaptive thermal ceiling control scheme can enhance the performance target of the aforementioned at least one functional block (e.g., the functional block 110_n) with accurate thermal operation capability evaluation by using the aforementioned at least one multiple hardware architecture levels adaptive ceiling policy, and more particularly, apply different thermal ceiling policies in different blocks (e.g., the functional blocks 110_1, 110_2, 110_3 and 110_4, such as the CPU, the GPU, the APU and the Modem (MD) shown in FIG. 2) and/or different system levels (e.g., the functional block level, the chip level, the board level and the whole device level), respectively.

Figure 5:
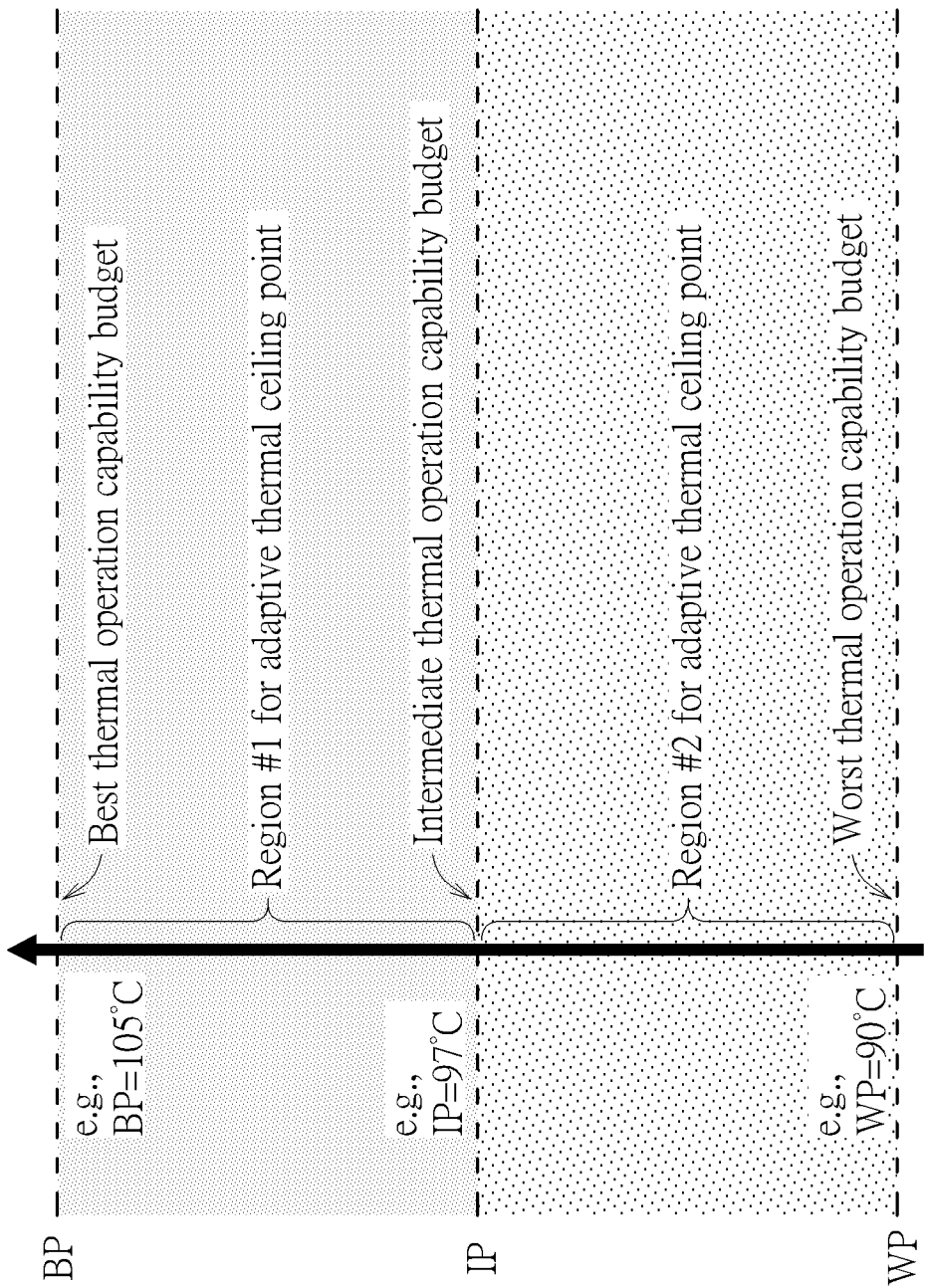
FIG. 5 is a diagram illustrating some implementation details of at least one multiple software architecture segments adaptive ceiling policy on different levels control (e.g., pre-throttle level decision) that can be used in the thermal control method according to an embodiment of the present invention.

FIG. 5 is a diagram illustrating some implementation details of the aforementioned at least one multiple software architecture segments adaptive ceiling policy on different levels control (e.g., pre-throttle level decision) that can be used in the thermal control method according to an embodiment of the present invention. The thermal control method can apply different thermal ceiling policies in different temperature segments such as multiple temperature regions for the adaptive thermal ceiling point, respectively. As shown in FIG. 5, the best thermal ceiling point BP can be regarded as the best thermal operation capability budget for the aforementioned at least one functional block (e.g., the functional block 110_n), and the worst thermal ceiling point WP can be regarded as the worst thermal operation capability budget for the aforementioned at least one functional block (e.g., the functional block 110_n). In addition, the region for the adaptive thermal ceiling point as shown in FIG. 3 can be divided into the multiple temperature regions by at least one intermediate thermal ceiling point (e.g., a single intermediate thermal ceiling point IP or a plurality of intermediate thermal ceiling points {IP}) within the interval (WP, BP) between the worst thermal ceiling point WP and the best thermal ceiling point BP. The aforementioned at least one intermediate thermal ceiling point (e.g., the single intermediate thermal ceiling point IP or the plurality of multiple intermediate thermal ceiling points {IP}) can be regarded as the intermediate thermal operation capability budget for the aforementioned at least one functional block (e.g., the functional block 110_n). For example, the aforementioned at least one intermediate thermal ceiling point may comprise the single intermediate thermal ceiling point IP, and the multiple temperature regions may comprise:

(1) Region #1: the interval [IP, BP] between the single intermediate thermal ceiling point IP and the best thermal ceiling point BP (labeled "Region #1 for adaptive thermal ceiling point" for better comprehension); and (2) Region #2: the interval [WP, IP] between the worst thermal ceiling point WP and the single intermediate thermal ceiling point IP (labeled "Region #2 for adaptive thermal ceiling point" for better comprehension);

where the best thermal ceiling point BP and the worst thermal ceiling point WP can be respectively determined as 105° C. and 90° C. (respectively labeled "BP=105° C." and "WP=90° C." for brevity), and the single intermediate thermal ceiling point IP can be determined as 97° C. (labeled "IP=97° C." for brevity), but the present invention is not limited thereto. For another example, the respective values of the best thermal ceiling point BP, the single intermediate thermal ceiling point IP and the worst thermal ceiling point WP may vary. For brevity, similar descriptions for this embodiment are not repeated in detail here.

According to some embodiments, the aforementioned at least one intermediate thermal ceiling point may comprise the plurality of multiple intermediate thermal ceiling points {IP} such as M intermediate thermal ceiling points {IP(1), . . . , IP(M)}, and the multiple temperature regions may comprise Regions #0, #1, #2, . . . and #M, such as the interval [WP, IP(1)] between the worst thermal ceiling point WP and the intermediate thermal ceiling point IP(1), the interval [IP(m), IP(m+1)] between the intermediate thermal ceiling points IP(m) and IP(m+1), and the interval [IP(M), BP] between the intermediate thermal ceiling point IP(M) and the best thermal ceiling point BP on the temperature axis, where the symbol "M" may represent a positive integer that is greater than one, and the symbol "m" may represent an integer falling within the interval [1, (M-1)]. For example, the best thermal ceiling point BP and the worst thermal ceiling point WP can be respectively determined as 105° C. and 90° C., and the plurality of multiple intermediate thermal ceiling points {IP} such as the M intermediate thermal ceiling points {IP(1), IP(M)} can be respectively determined as different values within the interval (WP, BP) between the worst thermal ceiling point WP and the best thermal ceiling point BP, but the present invention is not limited thereto. For another example, the respective values of the best thermal ceiling point BP, the M intermediate thermal ceiling points {IP(1), IP(M)} and the worst thermal ceiling point WP may vary. For brevity, similar descriptions for these embodiments are not repeated in detail here.

Figure 6:
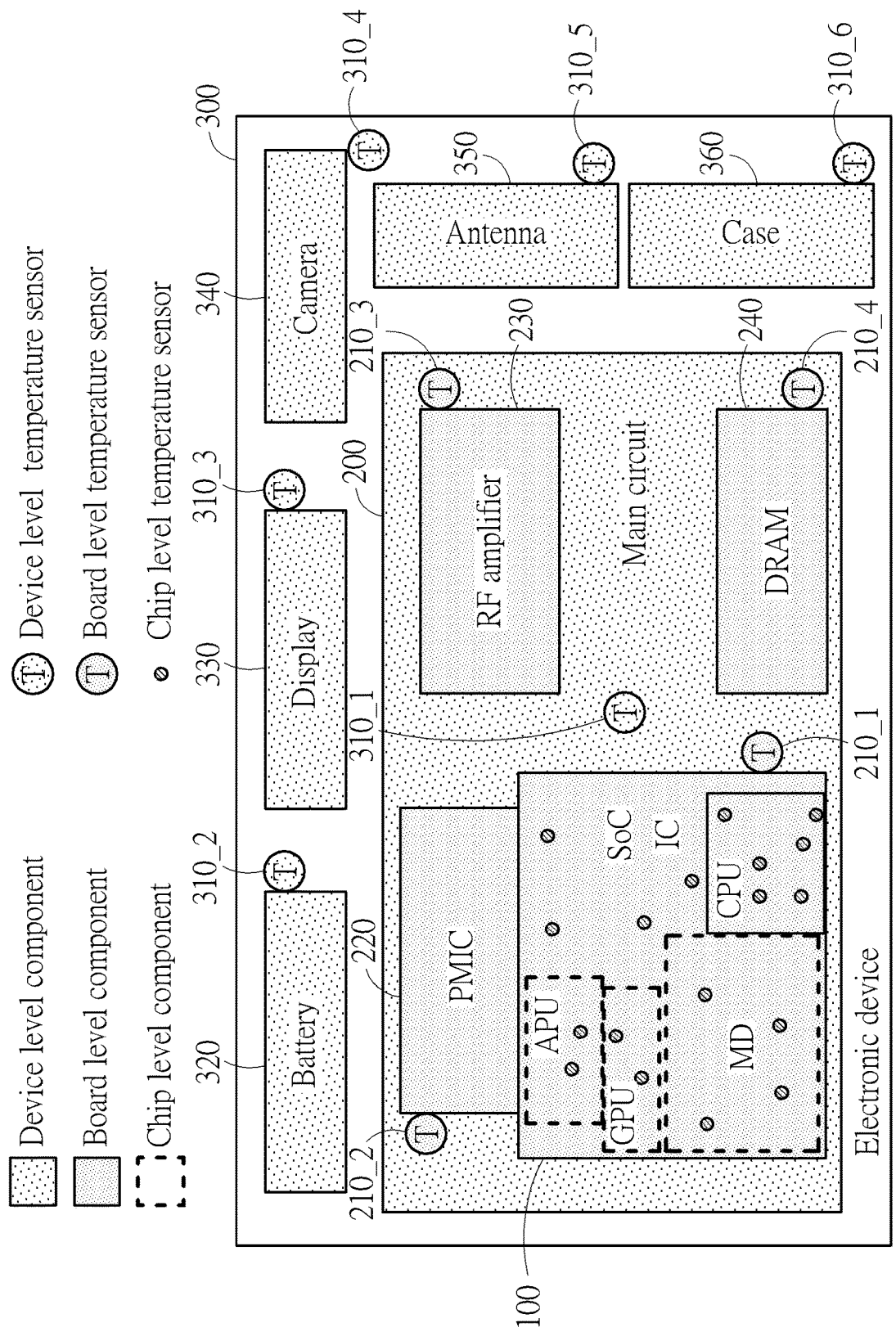
FIG. 6 is a diagram illustrating some implementation details of at least one multiple hardware architecture levels adaptive ceiling policy that can be used in the thermal control method according to an embodiment of the present invention.

FIG. 6 is a diagram illustrating some implementation details of the aforementioned at least one multiple hardware architecture levels adaptive ceiling policy that can be used in the thermal control method according to an embodiment of the present invention. The thermal control method can apply different thermal ceiling policies in different blocks such as the functional blocks 110_1, 110_2, . . . and 110_N (e.g., the CPU, the GPU, the APU and the Modem (labeled "MD" for brevity)), and can apply different thermal ceiling policies in different system levels such as multiple system levels (e.g., the functional block level, the chip level, the board level and the whole device level), respectively.

For better comprehension, the IC 100 can be regarded as an SoC IC, and can be installed in a main circuit 200 which comprises the IC 100, and the main circuit 200 can be implemented by way of a main circuit board with a plurality of ICs mounted thereon, where the functional blocks 110_1, 110_2, 110_3, 110_4, etc. such as the CPU, the GPU, the APU, the Modem (labeled "MD" for brevity), etc. in the IC 100 shown in FIG. 2 can be regarded as chip level components, at least one portion (e.g., a portion or all) of the plurality of temperature sensors within the IC 100, such as a portion of temperature sensors or all temperature sensors among the temperature sensors TS(1), TS(2), TS(3), TS(4), TS(5), TS(6), TS(7), TS(8), TS(9), TS(10), TS(11), TS(12), TS(13), TS(14), TS(15), TS(16), TS(17) and TS(18) shown in FIG. 2, can be regarded as chip level temperature sensors, and the aforementioned at least one first temperature upper-limit UL1 of the aforementioned at least one functional block (e.g., the functional block 110_n) of the IC 100 can be at least one first chip-level temperature upper-limit UL1(1), but the present invention is not limited thereto. For example, in addition to the IC 100, the main circuit 200 may further comprise at least one additional IC (e.g., one or more additional ICs) such as the ICs 220, 230 and 240, and comprise a plurality of board-level temperature sensors such as the board-level temperature sensors 210_1, 210_2, 210_3 and 210_4 respectively corresponding to the ICs 100, 220, 230 and 240, where the ICs 100, 220, 230 and 240 in the main circuit 200 shown in FIG. 6 can be regarded as board level components. According to this embodiment, the IC 220 can be implemented as a power management IC (PMIC) that is coupled to the IC 100 and at least one other IC such as the ICs 230 and 240, and the aforementioned at least one other IC such as the ICs 230 and 240 can be implemented as a radio frequency (RF) amplifier and a dynamic random access memory (DRAM), respectively, and therefore the ICs 220, 230 and 240 can be respectively labeled "PMIC", "RF amplifier" and "DRAM" in FIG. 6, but the present invention is not limited thereto.

The aforementioned at least one other IC (e.g., the ICs 230 and 240 such as the RF amplifier and the DRAM) can be arranged to perform at least one other operation (e.g., RF signal amplification operations in the RF amplifier and data access/storage operations in the DRAM) for the IC 100. In addition, the plurality of board-level temperature sensors 210_1, 210_2, 210_3 and 210_4 can be positioned beside or next to the ICs 100, 220, 230 and 240, respectively, and can be arranged to perform temperature sensing within the main circuit 200 to generate the respective temperature sensing results of the ICs 100, 220, 230 and 240. Additionally, the aforementioned at least one thermal control circuit such as the thermal control circuit 120 can be arranged to perform thermal control on the ICs 100, 220, 230 and 240 to prevent the ICs 100, 220, 230 and 240 IC from overheating and inducing abnormal function operations, by monitoring the respective temperature sensing results of the ICs 100, 220, 230 and 240 and by trying to prevent the respective temperature sensing results of the ICs 100, 220, 230 and 240 from exceeding at least one first board-level temperature upper-limit UL1(2) (e.g., one or more first board-level temperature upper-limits {UL1(2)}) of the main circuit 200 (e.g., the ICs 100, 220, 230 and 240 thereof), where the aforementioned at least one first board-level temperature upper-limit UL1(2) is configurable with respect to at least one per-board thermal operation capability of the main circuit 200. For example, the aforementioned at least one thermal control circuit such as the thermal control circuit 120 can be implemented by way of hardware and/or software, such as pure hardware or the aforementioned at least one hybrid module (e.g., the one or more hybrid modules) of hardware and software, and more particularly, can be implemented as a single board-level thermal control circuit for collecting the temperature sensing results of all components (e.g., all ICs among the ICs 100, 220, 230 and 240) of the main circuit 200 and controlling the components (e.g., the ICs 100, 220, 230 and 240) of the main circuit 200 in a centralized board-level temperature-sensing and thermal control architecture, but the present invention is not limited thereto.

As shown in FIG. 6, the main circuit 200 can be installed in an electronic device 300 which comprises the main circuit 200, where the main circuit 200 can be a main component of the electronic device 300. For example, the electronic device 300 may further comprise at least one secondary component (e.g. one or more secondary components) such as the secondary components 320, 330, 340, 350 and 360, and comprise a plurality of device-level temperature sensors such as the device-level temperature sensors 310_1, 310_2, 310_3, 310_4, 310_5 and 310_6 respectively corresponding to the main circuit 200 and the secondary components 320, 330, 340, 350 and 360, where the main circuit 200 and the secondary components 320, 330, 340, 350 and 360 in the electronic device 300 shown in FIG. 6 can be regarded as device level components. According to this embodiment, the secondary components 320, 330, 340, 350 and 360 can be implemented as a battery, a display, at least one camera (e.g., one or more cameras), at least one antenna (e.g., one or more antennas) and a case, respectively, and therefore the secondary components 320, 330, 340, 350 and 360 can be respectively labeled "Battery", "Display", "Camera", "Antenna" and "Case" in FIG. 6, but the present invention is not limited thereto.

The aforementioned at least one secondary component (e.g., the secondary components 320, 330, 340, 350 and 360 such as the battery, the display, the aforementioned at least one camera, the aforementioned at least one antenna and the case) can be arranged to operate under control of the main circuit 200. In addition, the plurality of device-level temperature sensors such as the device-level temperature sensors 310_1, 310_2, 310_3, 310_4, 310_5 and 310_6 can be positioned within or near (e.g., on or beside/next to) the main circuit 200 and the secondary components 320, 330, 340, 350 and 360, respectively, and can be arranged to perform temperature sensing within the electronic device 300 to generate the respective temperature sensing results of the main circuit 200 and the secondary components 320, 330, 340, 350 and 360. Additionally, the aforementioned at least one thermal control circuit such as the thermal control circuit 120 can be arranged to perform thermal control on the main circuit 200 and the secondary components 320, 330, 340, 350 and 360 to prevent the main circuit 200 and the secondary components 320, 330, 340, 350 and 360 from overheating and inducing abnormal function operations, by monitoring the respective temperature sensing results of the main circuit 200 and the secondary components 320, 330, 340, 350 and 360 and by trying to prevent the respective temperature sensing results of the main circuit 200 and the secondary components 320, 330, 340, 350 and 360 from exceeding at least one first device-level temperature upper-limit UL1(3) (e.g., one or more first device-level temperature upper-limits {UL1(3)}) of the electronic device 300 (e.g., the main circuit 200 and the secondary components 320, 330, 340, 350 and 360 thereof), where the aforementioned at least one first device-level temperature upper-limit UL1(3) is configurable with respect to at least one per-device thermal operation capability of the electronic device 300. For example, the aforementioned at least one thermal control circuit such as the thermal control circuit 120 can be implemented by way of hardware and/or software, such as pure hardware or the aforementioned at least one hybrid module (e.g., the one or more hybrid modules) of hardware and software, and more particularly, can be implemented as a single device-level thermal control circuit for collecting the temperature sensing results of all components (e.g., all of the main circuit 200 and the secondary components 320, 330, 340, 350 and 360) of the electronic device 300 and controlling the components (e.g., the main circuit 200 and the secondary components 320, 330, 340, 350 and 360) of the electronic device 300 in a centralized device-level temperature-sensing and thermal control architecture, but the present invention is not limited thereto. For brevity, similar descriptions for this embodiment are not repeated in detail here.

According to some embodiments, the parameters {WP, BP, UL1, UL2, UL3, UL4, Region_A, Region_B} shown in FIG. 3 can be written as the chip-level parameters {WP(1), BP(1), UL1(1), UL2(1), UL3(1), UL4(1), Region_A(1), Region_B(1)} to correspond to the associated operations regarding the chip level, and more particularly, the parameters {WP, IP, BP} shown in FIG. 5 can be written as the chip-level parameters {WP(1), IP(1), BP(1)} to correspond to the associated operations regarding the chip level, but the present invention is not limited thereto. For example, the parameters {WP, BP, UL1, UL2, UL3, UL4, Region_A, Region_B} shown in FIG. 3 can be written as the board-level parameters {WP(2), BP(2), UL1(2), UL2(2), UL3(2), UL4(2), Region_A(2), Region_B(2)} to correspond to the associated operations regarding the board level, and more particularly, the parameters {WP, IP, BP} shown in FIG. 5 can be written as the board-level parameters {WP(2), IP(2), BP(2)} to correspond to the associated operations regarding the board level. For another example, the parameters {WP, BP, UL1, UL2, UL3, UL4, Region_A, Region_B} shown in FIG. 3 can be written as the device-level parameters {WP(3), BP(3), UL1(3), UL2(3), UL3(3), UL4(3), Region_A(3), Region_B(3)} to correspond to the associated operations regarding the whole device level, and more particularly, the parameters {WP, IP, BP} shown in FIG. 5 can be written as the device-level parameters {WP(3), IP(3), BP(3)} to correspond to the associated operations regarding the device level. For brevity, similar descriptions for these embodiments are not repeated in detail here.

Figure 7:
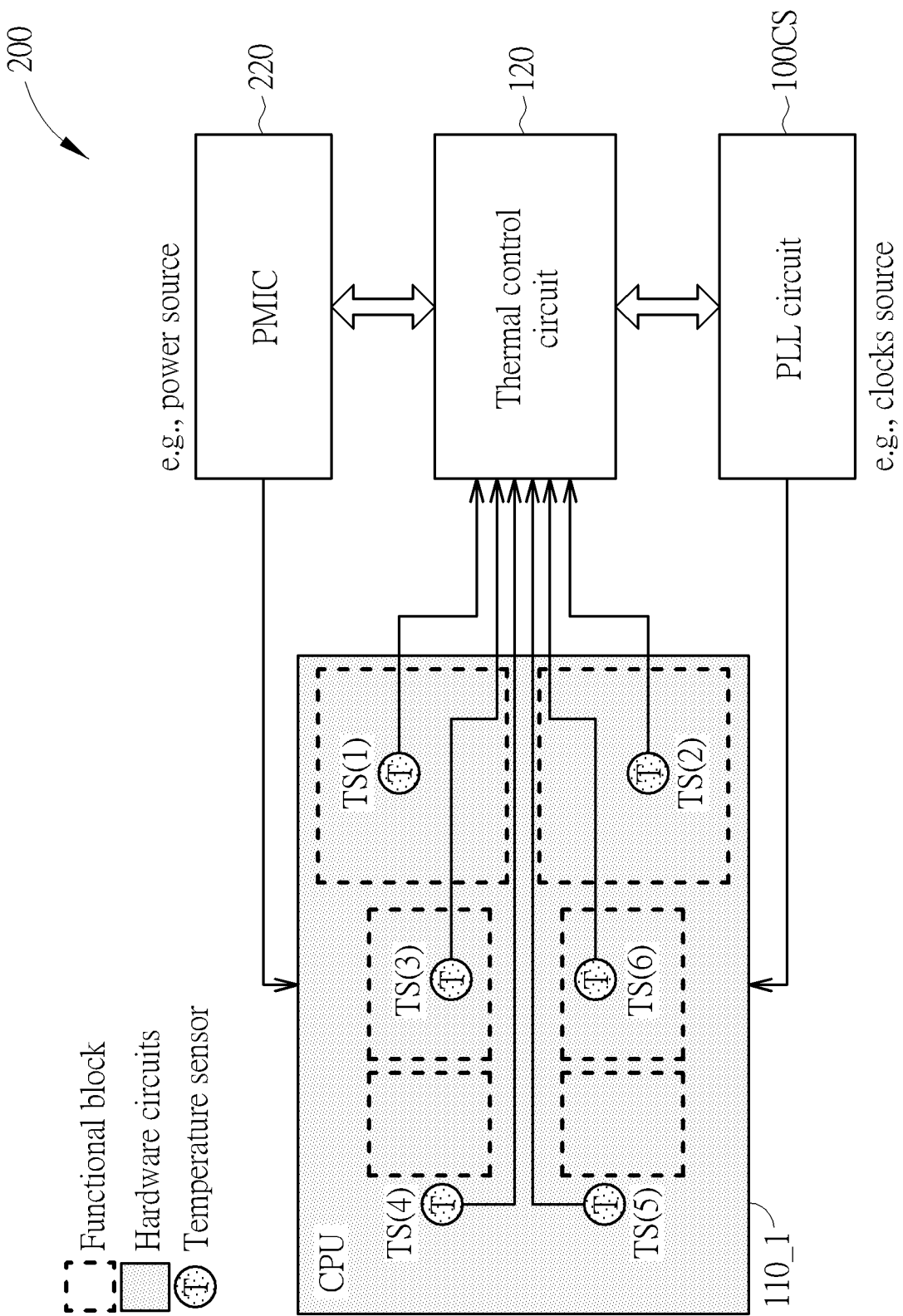
FIG. 7 is a diagram illustrating some implementation details of the aforementioned at least one multiple hardware architecture levels adaptive ceiling policy that can be used in the thermal control method according to another embodiment of the present invention.

FIG. 7 is a diagram illustrating some implementation details of the aforementioned at least one multiple hardware architecture levels adaptive ceiling policy that can be used in the thermal control method according to another embodiment of the present invention. The main circuit 200 may comprise a phase-locked loop (PLL) circuit 100CS, where the PLL circuit 100CS may be integrated with (e.g., next to or into) the IC 100, but the present invention is not limited thereto. In addition, the aforementioned at least one thermal control circuit such as the thermal control circuit 120 may perform thermal control with aid of the IC 220 such as the PMIC and the PLL circuit 100CS. For example, under control of the thermal control circuit 120, the IC 220 such as the PMIC may act as a power source of the IC 100 (e.g., the aforementioned any functional block 110_n among the functional blocks 110_1, 110_2, . . . and 110_N therein), and more particularly, act as the power source of the functional block 110_1 such as the CPU (labeled "power source" for brevity), and the PLL circuit 100CS may act as a clocks source of the IC 100 (e.g., the aforementioned any functional block 110_n among the functional blocks 110_1, 110_2, . . . and 110_N therein), and more particularly, act as the clocks source of the functional block 110_1 such as the CPU (labeled "clocks source" for brevity).

As shown in the upper half of FIG. 7, a power control loop may comprise at least one control path (e.g., one or more control paths) from the thermal control circuit 120 to the IC 220 (e.g., the PMIC), at least one power path (e.g., one or more power paths) from the IC 220 (e.g., the PMIC) to the aforementioned any functional block 110_n (e.g., the functional block 110_1 such as the CPU) of the IC 100, and associated path(s) among at least one feedback path (e.g., one or more feedback paths) from the aforementioned any functional block 110_n (e.g., the functional block 110_1 such as the CPU, and more particularly, one or more temperature sensors thereof) to the thermal control circuit 120. With the power control loop, the thermal control circuit 120 may control the IC 220 (e.g., the PMIC) to dynamically adjust the power that is managed by the IC 220 (e.g., the PMIC) and output to the aforementioned any functional block 110_n (e.g., the functional block 110_1 such as the CPU) via the aforementioned at least one power path.

As shown in the lower half of FIG. 7, a clock control loop may comprise at least one control path (e.g., one or more control paths) from the thermal control circuit 120 to the PLL circuit 100CS, at least one clock path (e.g., one or more clock paths) from the PLL circuit 100CS to the aforementioned any functional block 110_n (e.g., the functional block 110_1 such as the CPU) of the IC 100, and associated path(s) among the aforementioned at least one feedback path (e.g., the one or more feedback paths) from the aforementioned any functional block 110_n (e.g., the functional block 110_1 such as the CPU, and more particularly, the one or more temperature sensors thereof) to the thermal control circuit 120. With the clock control loop, the thermal control circuit 120 may control the PLL circuit 100CS to dynamically adjust any clock (e.g., the frequency thereof) among at least one clock (e.g., one or more clocks) that is maintained by the PLL circuit 100CS and output to the aforementioned any functional block 110_n (e.g., the functional block 110_1 such as the CPU) via the aforementioned at least one clock path.

For example, the aforementioned at least one thermal control circuit such as the thermal control circuit 120 can be implemented by way of hardware and/or software, such as pure hardware or the aforementioned at least one hybrid module (e.g., the one or more hybrid modules) of hardware and software, and more particularly, can be implemented as a single functional-block-level thermal control circuit for collecting the temperature sensing results of multiple sub-functional blocks (e.g., multiple secondary functional blocks) within the functional block 110_1 such as the CPU and controlling the multiple sub-functional blocks (e.g., the multiple secondary functional blocks) within the functional block 110_1 such as the CPU in a centralized functional-block-level temperature-sensing and thermal control architecture, but the present invention is not limited thereto. For example, the multiple sub-functional blocks such as the multiple secondary functional blocks can also be regarded as functional blocks within the IC 100. For brevity, similar descriptions for this embodiment are not repeated in detail here.

According to the embodiment shown in FIG. 7, the functional block 110_1 such as the CPU can be taken as an example of the aforementioned any functional block 110_n, and the one or more temperature sensors thereof may comprise the temperature sensors TS(1), TS(2), TS(3), TS(4), TS(5) and TS(6) integrated with (e.g., next to or into) some secondary functional blocks therein, where the aforementioned at least one feedback path may comprise multiple feedback paths from the temperature sensors TS(1), TS(2), TS(3), TS(4), TS(5) and TS(6) to the thermal control circuit 120, but the present invention is not limited thereto. According to another embodiment, any other functional block among the functional blocks 110_1, 110_2, . . . and 110_N can be taken as an example of the aforementioned any functional block 110_n. According to some embodiments, the architecture of the aforementioned any functional block 110_n (e.g., the functional block 110_1 such as the CPU) may vary. For example, any temperature sensor of the aforementioned any functional block 110_n (e.g., the functional block 110_1 such as the CPU) may be positioned next to or within a certain secondary functional block thereof. For brevity, similar descriptions for these embodiments are not repeated in detail here.

Figure 8:
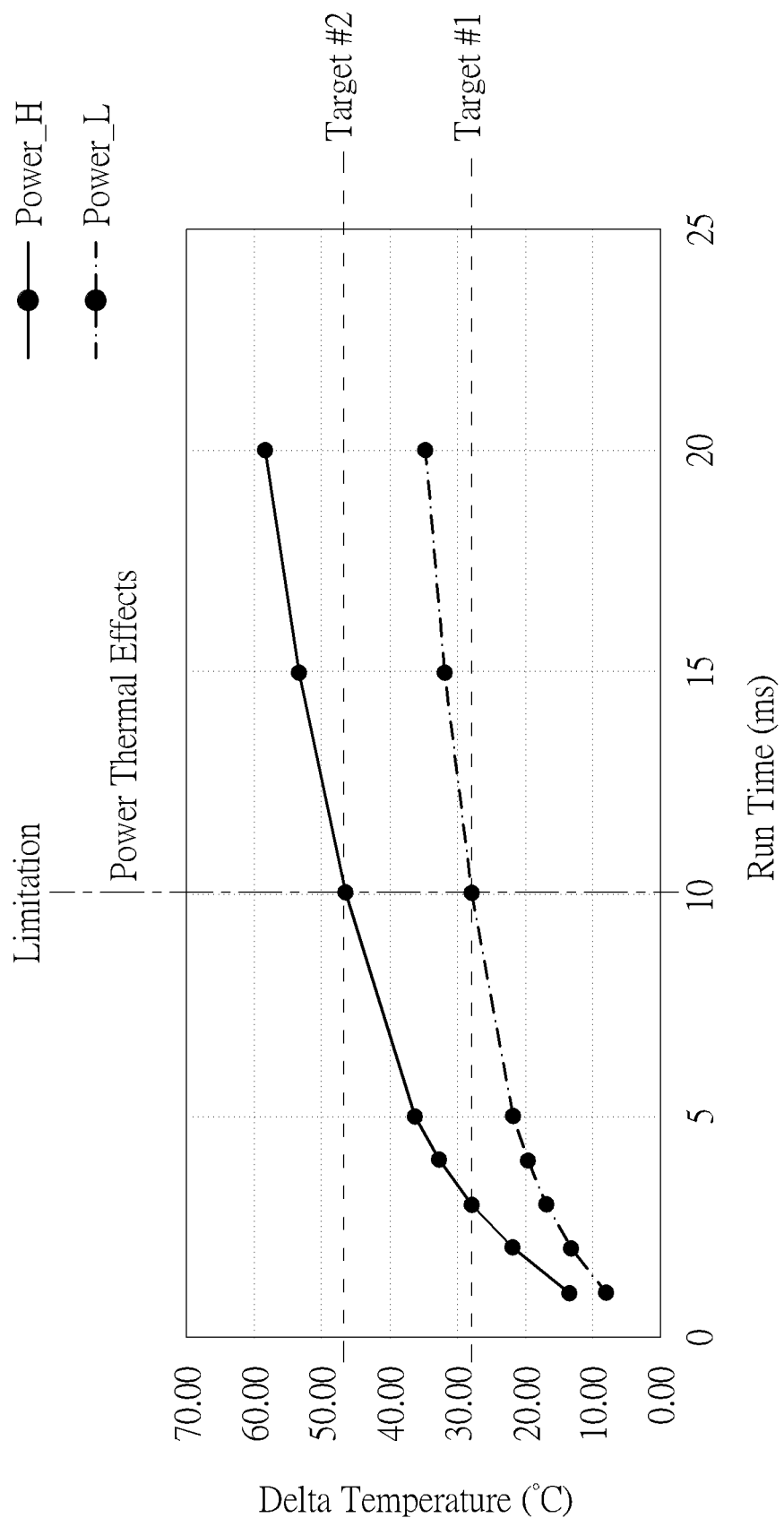
FIG. 8 is a diagram illustrating a thermal operation capability evaluation control scheme of the thermal control method according to a first embodiment of the present invention.

FIG. 8 is a diagram illustrating a thermal operation capability evaluation control scheme of the thermal control method according to a first embodiment of the present invention. For example, the aforementioned at least one per-functional-block thermal operation capability may comprise TOC #1 of a specific functional block (e.g., the functional block 110_n) of the IC 100, i.e., the power-to-thermal efficiency of the specific functional block (e.g., the functional block 110_n), such as the power thermal effects shown in FIG. 8, where the horizontal axis may represent run time and may be measured in unit of milliseconds (ms), and the vertical axis may represent delta temperature (e.g., a temperature difference such as an increment in temperature) and may be measured in unit of degrees Celsius (° C.), but the present invention is not limited thereto. According to some embodiments, the associated units may vary. In addition, the two curves shown in FIG. 8 may correspond to different power consumption behaviors such as the high power consumption behavior Power_H and the low power consumption behavior Power_L, where high power samples of the high power consumption behavior Power_H (e.g., IC products having the high power consumption behavior Power_H) may induce higher thermal responses, and low power samples of the low power consumption behavior Power_L (e.g., IC products having the low power consumption behavior Power_L) may induce lower thermal responses. When a limitation such as a predetermined value (e.g., 10 (ms)) on the horizontal axis is determined in advance as shown in FIG. 8, different targets on the vertical axis, such as Target #2 and Target #1 respectively corresponding to the high power consumption behavior Power_H and the low power consumption behavior Power_L, can be determined according to the two curves shown in FIG. 8, respectively, for configuring the first temperature upper-limit UL1 of the specific functional block (e.g., the functional block 110_n) for different batches of IC products among the plurality of IC products of the IC 100, respectively.

For example, the production tool of the IC 100 may be arranged to perform the functions or chip binning flow on a first batch of IC products among the plurality of IC products for configuring the first temperature upper-limit UL1 of the specific functional block (e.g., the functional block 110_n) for the first batch of IC products, and more particularly, to determine (e.g., classify) the first batch of IC products as having the low power consumption behavior Power_L, and configure the first temperature upper-limit UL1 of the specific functional block with respect to the thermal operation capability (e.g., TOC #1) of the specific functional block of the ICs {100} in the first batch of IC products in order to achieve the maximum performance of the first batch of IC products, and therefore, set the first temperature upper-limit UL1 of the specific functional block (e.g., the functional block 110_n) of any IC 100 (e.g., each IC 100) among the ICs {100} in the first batch of IC products as follows:

$UL1 = UL2 - \text{Target1}$;

where Target1 in the above equation may represent Target #1 shown in FIG. 8, and may be determined according to the curve corresponding to the low power consumption behavior Power_L as shown in FIG. 8, but the present invention is not limited thereto. In addition, the production tool of the IC 100 may be arranged to perform the functions or chip binning flow on a second batch of IC products among the plurality of IC products for configuring the first temperature upper-limit UL1 of the specific functional block (e.g., the functional block 110_n) for the second batch of IC products, and more particularly, to determine (e.g., classify) the second batch of IC products as having the high power consumption behavior Power_H, and configure the first temperature upper-limit UL1 of the specific functional block with respect to the thermal operation capability (e.g., TOC #1) of the specific functional block of the ICs {100} in the second batch of IC products in order to achieve the maximum performance of the second batch of IC products, and therefore, set the first temperature upper-limit UL1 of the specific functional block (e.g., the functional block 110_n) of any IC 100 (e.g., each IC 100) among the ICs {100} in the second batch of IC products as follows:

$UL1 = UL2 - \text{Target2}$;

where Target2 in the above equation may represent Target #2 shown in FIG. 8, and may be determined according to the curve corresponding to the high power consumption behavior Power_H as shown in FIG. 8, but the present invention is not limited thereto. In comparison with the related art, the specific functional block (e.g., the functional block 110_n) of the IC 100 (e.g., the functional block 110_n of any IC 100 among the ICs {100} in the first batch of IC products and the functional block 110_n of any IC 100 among the ICs {100} in the second batch of IC products) can operate correctly in various situations while achieving the maximum performance, where the first temperature upper-limit UL1 of the specific functional block can be configured with respect to the thermal operation capability (e.g., TOC #1) of the specific functional block, to make the first temperature upper-limit UL1 of the specific functional block be as high as possible. For brevity, similar descriptions for this embodiment are not repeated in detail here.

Figure 9:
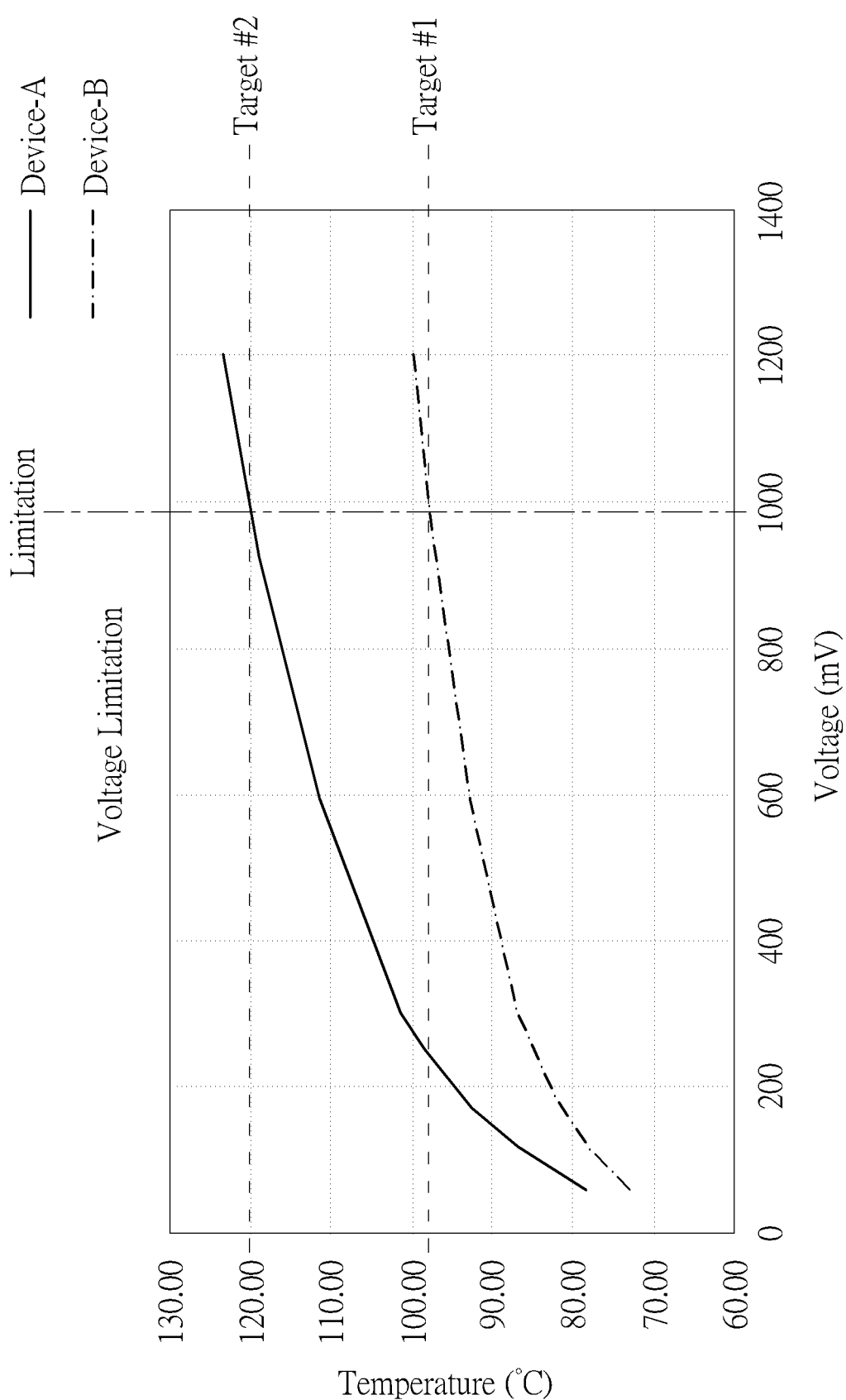
FIG. 9 is a diagram illustrating a thermal operation capability evaluation control scheme of the thermal control method according to a second embodiment of the present invention.

FIG. 9 is a diagram illustrating a thermal operation capability evaluation control scheme of the thermal control method according to a second embodiment of the present invention. For example, the aforementioned at least one per-functional-block thermal operation capability may comprise TOC #2 of the specific functional block (e.g., the functional block 110_n) of the IC 100, i.e., the maximum voltage budget of the specific functional block (e.g., the functional block 110_n), such as the voltage limitation shown in FIG. 9, where the horizontal axis may represent voltage and may be measured in unit of millivolts (mV), and the vertical axis may represent temperature and may be measured in unit of degrees Celsius (° C.), but the present invention is not limited thereto. According to some embodiments, the associated units may vary. In addition, the two curves shown in FIG. 9 may correspond to different voltage-related behaviors of the same functional block (e.g., the functional block 110_n) in different ICs {100}, such as a first voltage-related behavior and a second voltage-related behavior (labeled "Device-A" and "Device-B" for brevity), respectively, where the operating temperature may be limited by the voltage budget for system stability, and more particularly, may be limited in different manners for first samples of the first voltage-related behavior and second samples of the second voltage-related behavior, respectively. When a limitation such as a predetermined value (e.g., 890 (mV)) on the horizontal axis is determined in advance as shown in FIG. 9, different targets on the vertical axis, such as Target #1 and Target #2 respectively corresponding to the second voltage-related behavior and the first voltage-related behavior (labeled "Device-B" and "Device-A" for brevity), can be determined according to the two curves shown in FIG. 9, respectively, for configuring the first temperature upper-limit UL1 of the specific functional block (e.g., the functional block 110_n) for different batches of IC products among the plurality of IC products of the IC 100, respectively.

For example, the production tool of the IC 100 may be arranged to perform the functions or chip binning flow on a first batch of IC products among the plurality of IC products of the IC 100 for configuring the first temperature upper-limit UL1 of the specific functional block (e.g., the functional block 110_n) for the first batch of IC products, and more particularly, to determine (e.g., classify) the first batch of IC products as having the second voltage-related behavior (labeled "Device-B" for brevity), and configure the first temperature upper-limit UL1 of the specific functional block with respect to the thermal operation capability (e.g., TOC #2) of the specific functional block of the ICs {100} in the first batch of IC products in order to achieve the maximum performance of the first batch of IC products, and therefore, set the first temperature upper-limit UL1 of the specific functional block (e.g., the functional block 110_n) of any IC 100 (e.g., each IC 100) among the ICs {100} in the first batch of IC products as follows:

$$UL1 = \text{Target1};$$

where Target1 in the above equation may represent Target #1 shown in FIG. 9, and may be determined according to the curve corresponding to the second voltage-related behavior (labeled "Device-B" for brevity) as shown in FIG. 9, but the present invention is not limited thereto. In addition, the production tool of the IC 100 may be arranged to perform the functions or chip binning flow on a second batch of IC products among the plurality of IC products of the IC 100 for configuring the first temperature upper-limit UL1 of the specific functional block (e.g., the functional block 110_n) for the second batch of IC products, and more particularly, to determine (e.g., classify) the second batch of IC products as having the first voltage-related behavior (labeled "Device-A" for brevity), and configure the first temperature upper-limit UL1 of the specific functional block with respect to the thermal operation capability (e.g., TOC #2) of the specific functional block of the ICs {100} in the second batch of IC products in order to achieve the maximum performance of the second batch of IC products, and therefore, set the first temperature upper-limit UL1 of the specific functional block (e.g., the functional block 110_n) of any IC 100 (e.g., each IC 100) among the ICs {100} in the second batch of IC products as follows:

$$UL1 = \text{Target2};$$

where Target2 in the above equation may represent Target #2 shown in FIG. 9, and may be determined according to the curve corresponding to the first voltage-related behavior (labeled "Device-A" for brevity) as shown in FIG. 9, but the present invention is not limited thereto. In comparison with the related art, the specific functional block (e.g., the functional block 110_n of the IC 100 (e.g., the functional block 110_n of any IC 100 among the ICs {100} in the first batch of IC products and the functional block 110_n of any IC 100 among the ICs {100} in the second batch of IC products) can operate correctly in various situations while achieving the maximum performance, where the first temperature upper-limit UL1 of the specific functional block can be configured with respect to the thermal operation capability (e.g., TOC #2) of the specific functional block, to make the first temperature upper-limit UL1 of the specific functional block be as high as possible. For brevity, similar descriptions for this embodiment are not repeated in detail here.

Figure 10:
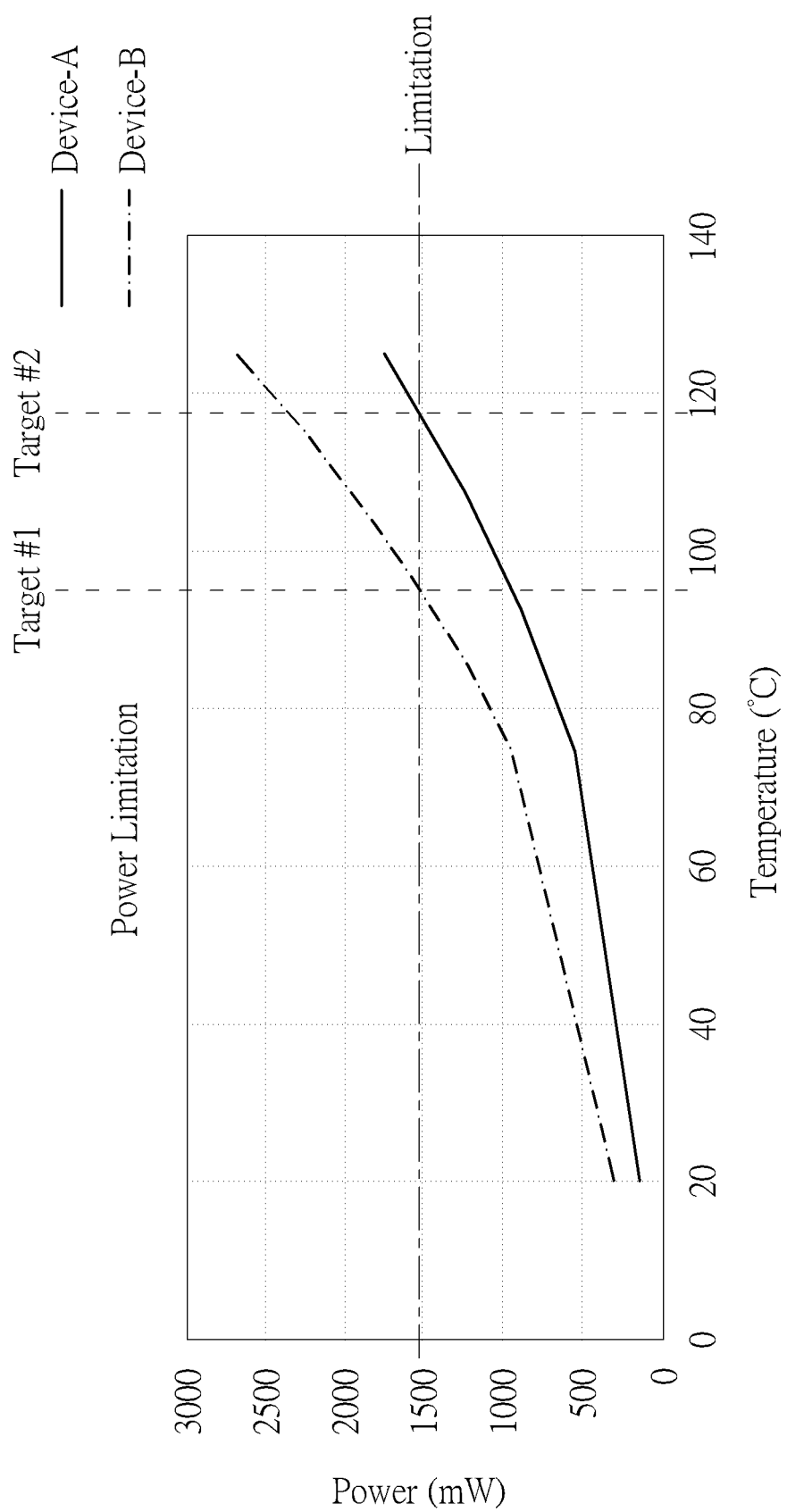
FIG. 10 is a diagram illustrating a thermal operation capability evaluation control scheme of the thermal control method according to a third embodiment of the present invention.

FIG. 10 is a diagram illustrating a thermal operation capability evaluation control scheme of the thermal control method according to a third embodiment of the present invention. For example, the aforementioned at least one per-functional-block thermal operation capability may comprise TOC #3 of the specific functional block (e.g., the functional block 110_n) of the IC 100, i.e., the maximum power budget of the specific functional block (e.g., the functional block 110_n), such as the power limitation shown in FIG. 10, where the horizontal axis may represent temperature and may be measured in unit of degrees Celsius (° C.), and the vertical axis may represent power and may be measured in unit of milliwatts (mW), but the present invention is not limited thereto. According to some embodiments, the associated units may vary. In addition, the two curves shown in FIG. 10 may correspond to different power-related behaviors of the same functional block (e.g., the functional block 110_n) in different ICs {100}, such as a first power-related behavior and a second power-related behavior (labeled "Device-A" and "Device-B" for brevity), respectively, where the operating temperature may be limited by the power budget for system stability, and more particularly, may be limited in different manners for first samples of the first power-related behavior and second samples of the second power-related behavior, respectively. When a limitation such as a predetermined value (e.g., 1525 (mW)) on the vertical axis is determined in advance as shown in FIG. 10, different targets on the horizontal axis, such as Target #1 and Target #2 respectively corresponding to the second power-related behavior and the first power-related behavior (labeled "Device-B" and "Device-A" for brevity), can be determined according to the two curves shown in FIG. 10, respectively, for configuring the first temperature upper-limit UL1 of the specific functional block (e.g., the functional block 110_n) for different batches of IC products among the plurality of IC products of the IC 100, respectively.

For example, the production tool of the IC 100 may be arranged to perform the functions or chip binning flow on a first batch of IC products among the plurality of IC products of the IC 100 for configuring the first temperature upper-limit UL1 of the specific functional block (e.g., the functional block 110_n) for the first batch of IC products, and more particularly, to determine (e.g., classify) the first batch of IC products as having the second power-related behavior (labeled "Device-B" for brevity), and configure the first temperature upper-limit UL1 of the specific functional block with respect to the thermal operation capability (e.g., TOC #3) of the specific functional block of the ICs {100} in the first batch of IC products in order to achieve the maximum performance of the first batch of IC products, and therefore, set the first temperature upper-limit UL1 of the specific functional block (e.g., the functional block 110_n) of any IC 100 (e.g., each IC 100) among the ICs {100} in the first batch of IC products as follows:

$$UL1 = \text{Target1};$$

where Target1 in the above equation may represent Target #1 shown in FIG. 10, and may be determined according to the curve corresponding to the second power-related behavior (labeled "Device-B" for brevity) as shown in FIG. 10, but the present invention is not limited thereto. In addition, the production tool of the IC 100 may be arranged to perform the functions or chip binning flow on a second batch of IC products among the plurality of IC products of the IC 100 for configuring the first temperature upper-limit UL1 of the specific functional block (e.g., the functional block 110_n) for the second batch of IC products, and more particularly, to determine (e.g., classify) the second batch of IC products as having the first power-related behavior (labeled "Device-A" for brevity), and configure the first temperature upper-limit UL1 of the specific functional block with respect to the thermal operation capability (e.g., TOC #3) of the specific functional block of the ICs {100} in the second batch of IC products in order to achieve the maximum performance of the second batch of IC products, and therefore, set the first temperature upper-limit UL1 of the specific functional block (e.g., the functional block 110_n) of any IC 100 (e.g., each IC 100) among the ICs {100} in the second batch of IC products as follows:

$$UL1 = Target2;$$

where Target2 in the above equation may represent Target #2 shown in FIG. 10, and may be determined according to the curve corresponding to the first power-related behavior (labeled "Device-A" for brevity) as shown in FIG. 10, but the present invention is not limited thereto. In comparison with the related art, the specific functional block (e.g., the functional block 110_n) of the IC 100 (e.g., the functional block 110_n of any IC 100 among the ICs {100} in the first batch of IC products and the functional block 110_n of any IC 100 among the ICs {100} in the second batch of IC products) can operate correctly in various situations while achieving the maximum performance, where the first temperature upper-limit UL1 of the specific functional block can be configured with respect to the thermal operation capability (e.g., TOC #3) of the specific functional block, to make the first temperature upper-limit UL1 of the specific functional block be as high as possible. For brevity, similar descriptions for this embodiment are not repeated in detail here.

Figure 11:
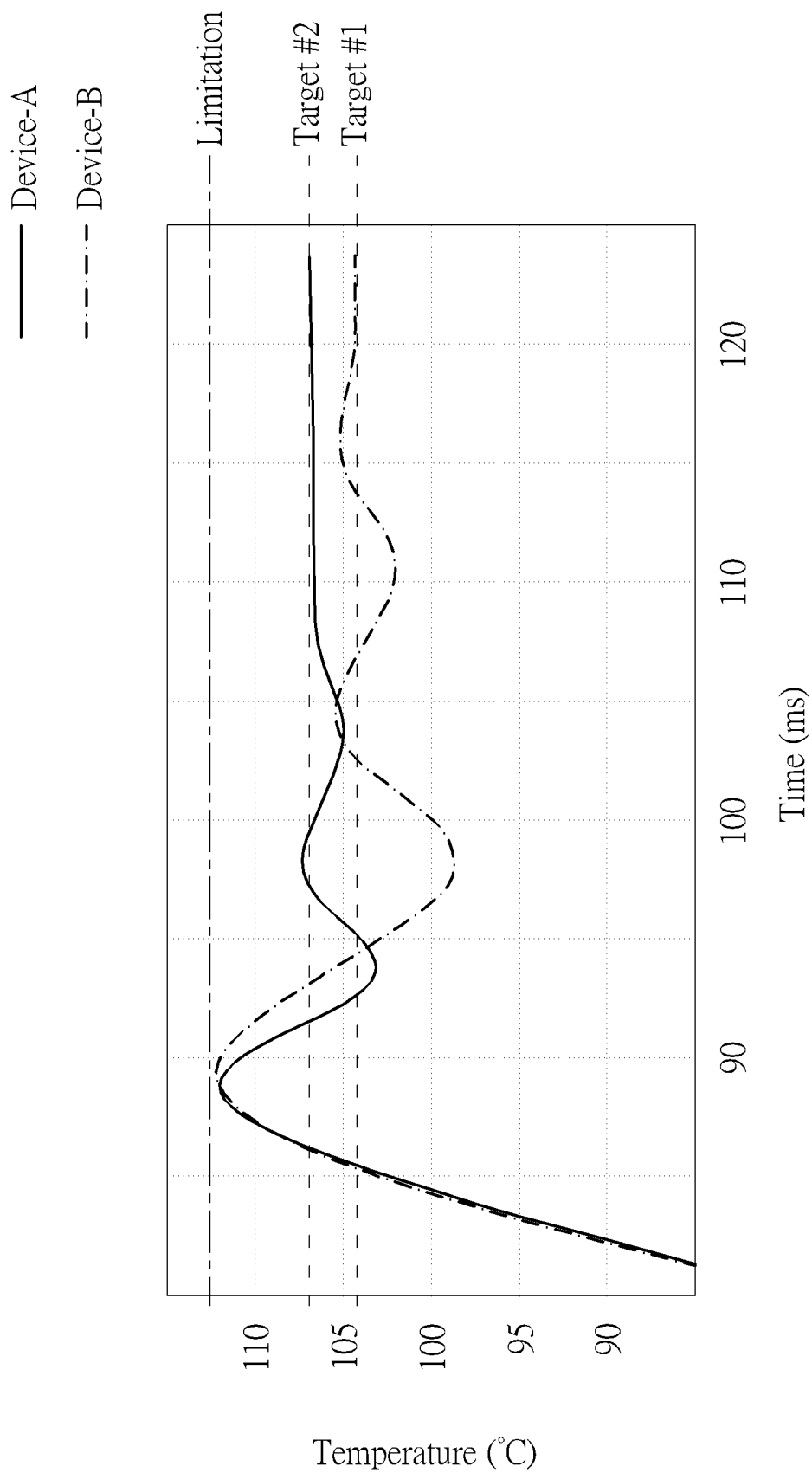
FIG. 11 is a diagram illustrating a thermal operation capability evaluation control scheme of the thermal control method according to a fourth embodiment of the present invention.

FIG. 11 is a diagram illustrating a thermal operation capability evaluation control scheme of the thermal control method according to a fourth embodiment of the present invention. For example, the aforementioned at least one per-functional-block thermal operation capability may comprise TOC #4 of the specific functional block (e.g., the functional block 110_n) of the IC 100, i.e., the thermal control efficiency of the specific functional block (e.g., the functional block 110_n), such as the overshoot/undershoot temperature behaviors (e.g., overshoot temperature behaviors and/or undershoot temperature behaviors) shown in FIG. 11, where the horizontal axis may represent time and may be measured in unit of milliseconds (ms), and the vertical axis may represent temperature and may be measured in unit of degrees Celsius (° C.), but the present invention is not limited thereto. According to some embodiments, the associated units may vary. In addition, the two curves shown in FIG. 11 may correspond to different overshoot/undershoot temperature behaviors of the same functional block (e.g., the functional block 110_n) in different ICs {100}, such as a first overshoot/undershoot temperature behavior and a second overshoot/undershoot temperature behavior (labeled "Device-A" and "Device-B" for brevity), respectively, where the operating temperature may be limited by a margin for preventing the influence of the overshoot/undershoot temperature behaviors, and more particularly, may be limited in different manners for first samples of the first overshoot/undershoot temperature behavior and second samples of the second overshoot/undershoot temperature behavior, respectively. When a limitation such as a predetermined value (e.g., 112.5 (° C.)) on the vertical axis is determined in advance as shown in FIG. 11, different targets on the vertical axis, such as Target #1 and Target #2 respectively corresponding to the second overshoot/undershoot temperature behavior and the first overshoot/undershoot temperature behavior (labeled "Device-B" and "Device-A" for brevity), can be determined according to the two curves shown in FIG. 11, respectively, for configuring the first temperature upper-limit UL1 of the specific functional block (e.g., the functional block 110_n) for different batches of IC products among the plurality of IC products of the IC 100, respectively.

For example, the production tool of the IC 100 may be arranged to perform the functions or chip binning flow on a first batch of IC products among the plurality of IC products of the IC 100 for configuring the first temperature upper-limit UL1 of the specific functional block (e.g., the functional block 110_n) for the first batch of IC products, and more particularly, to determine (e.g., classify) the first batch of IC products as having the second overshoot/undershoot temperature behavior (labeled "Device-B" for brevity), and configure the first temperature upper-limit UL1 of the specific functional block with respect to the thermal operation capability (e.g., TOC #4) of the specific functional block of the ICs {100} in the first batch of IC products in order to achieve the maximum performance of the first batch of IC products, and therefore, set the first temperature upper-limit UL1 of the specific functional block (e.g., the functional block 110_n) of any IC 100 (e.g., each IC 100) among the ICs {100} in the first batch of IC products as follows:

$$UL1 = UL2 - (Limit0 - Target1);$$

where Target1 in the above equation may represent Target #1 shown in FIG. 11, and may be determined according to the curve corresponding to the second overshoot/undershoot temperature behavior (labeled "Device-B" for brevity) as shown in FIG. 11, and Limit0 in the above equation may represent Limitation shown in FIG. 11, but the present invention is not limited thereto. In addition, the production tool of the IC 100 may be arranged to perform the functions or chip binning flow on a second batch of IC products among the plurality of IC products of the IC 100 for configuring the first temperature upper-limit UL1 of the specific functional block (e.g., the functional block 110_n) for the second batch of IC products, and more particularly, to determine (e.g., classify) the second batch of IC products as having the first overshoot/undershoot temperature behavior (labeled "Device-A" for brevity), and configure the first temperature upper-limit UL1 of the specific functional block with respect to the thermal operation capability (e.g., TOC #4) of the specific functional block of the ICs {100} in the second batch of IC products in order to achieve the maximum performance of the second batch of IC products, and therefore, set the first temperature upper-limit UL1 of the specific functional block (e.g., the functional block 110_n) of any IC 100 (e.g., each IC 100) among the ICs {100} in the second batch of IC products as follows:

$$UL1 = UL2 - (Limit0 - Target2);$$

where Target2 in the above equation may represent Target #2 shown in FIG. 11, and may be determined according to the curve corresponding to the first overshoot/undershoot temperature behavior (labeled "Device-A" for brevity) as shown in FIG. 11, and Limit0 in the above equation may represent Limitation shown in FIG. 11, but the present invention is not limited thereto. In comparison with the related art, the specific functional block (e.g., the functional block 110_n) of the IC 100 (e.g., the functional block 110_n of any IC 100 among the ICs {100} in the first batch of IC products and the functional block 110_n of any IC 100 among the ICs {100} in the second batch of IC products) can operate correctly in various situations while achieving the maximum performance, where the first temperature upper-limit UL1 of the specific functional block can be configured with respect to the thermal operation capability (e.g., TOC #4) of the specific functional block, to make the first temperature upper-limit UL1 of the specific functional block be as high as possible. For brevity, similar descriptions for this embodiment are not repeated in detail here.

Figure 12:
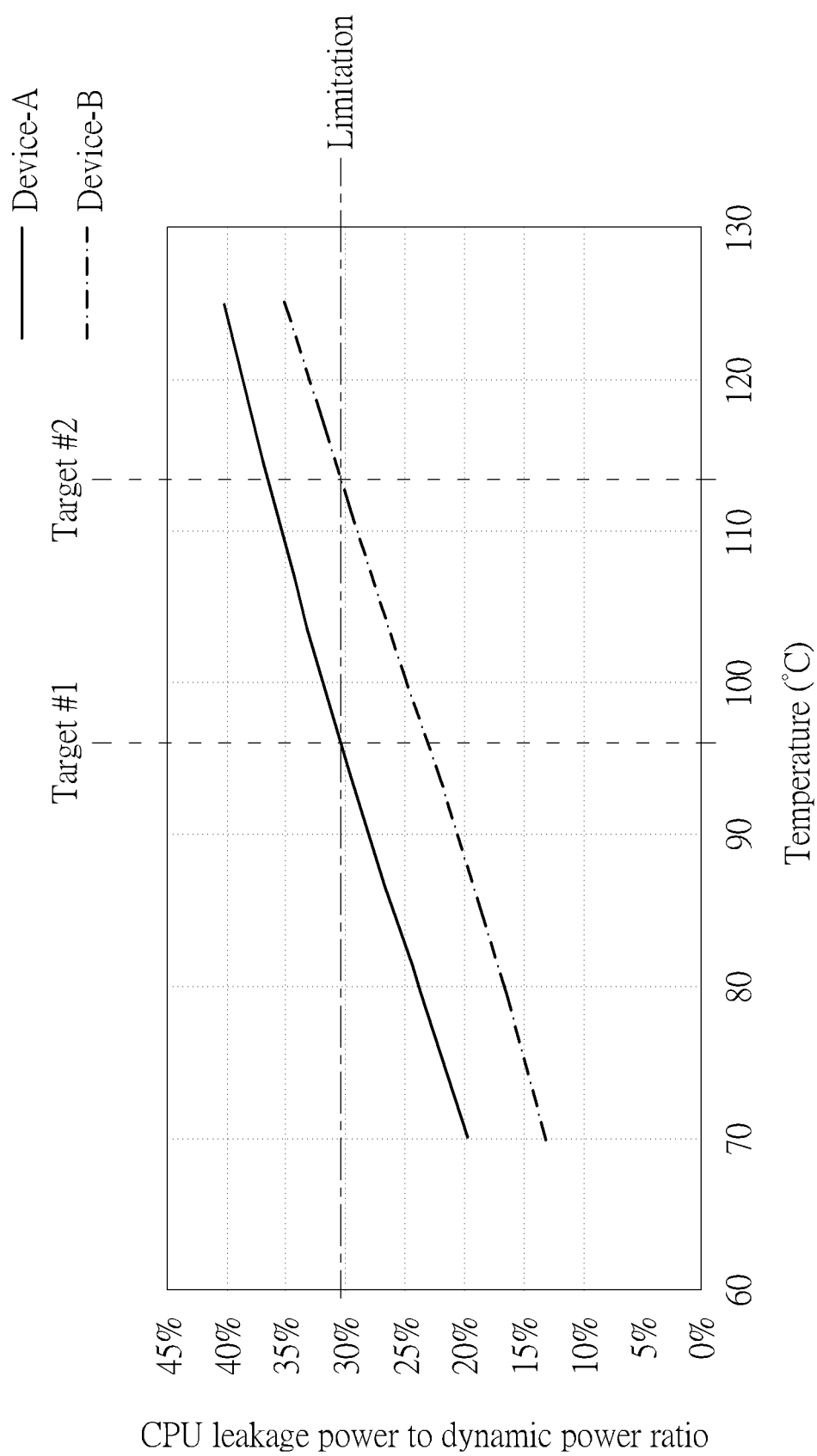
FIG. 12 is a diagram illustrating a thermal operation capability evaluation control scheme of the thermal control method according to a fifth embodiment of the present invention.

FIG. 12 is a diagram illustrating a thermal operation capability evaluation control scheme of the thermal control method according to a fifth embodiment of the present invention. For example, the aforementioned at least one per-functional-block thermal operation capability may comprise TOC #5 of the specific functional block (e.g., the functional block 110_n) of the IC 100, i.e., the operation power efficiency regarding temperature level of the specific functional block (e.g., the functional block 110_n), such as the relationships between the CPU leakage power to dynamic power ratio (e.g., the ratio of the CPU leakage power to the dynamic power) and the temperature as shown in FIG. 12, where the horizontal axis may represent temperature and may be measured in unit of degrees Celsius (° C.), and the vertical axis may represent the CPU leakage power to dynamic power ratio and may be expressed in unit of percentages (%), but the present invention is not limited thereto. According to some embodiments, the associated units may vary. In addition, the two curves shown in FIG. 12 may correspond to different power-ratio-related behaviors of the same functional block (e.g., the functional block 110_n) in different ICs {100}, such as a first power-ratio-related behavior and a second power-ratio-related behavior (labeled "Device-A" and "Device-B" for brevity), respectively, where the operating temperature may be limited by the power ratio budget of the CPU leakage power to dynamic power ratio, and more particularly, may be limited in different manners for first samples of the first power-ratio-related behavior and second samples of the second power-ratio-related behavior, respectively. When a limitation such as a predetermined value (e.g., 30.5%) on the vertical axis is determined in advance as shown in FIG. 12, different targets on the horizontal axis, such as Target #1 and Target #2 respectively corresponding to the first power-ratio-related behavior and the second power-ratio-related behavior (labeled "Device-A" and "Device-B" for brevity), can be determined according to the two curves shown in FIG. 12, respectively, for configuring the first temperature upper-limit UL1 of the specific functional block (e.g., the functional block 110_n) for different batches of IC products among the plurality of IC products of the IC 100, respectively.

For example, the production tool of the IC 100 may be arranged to perform the functions or chip binning flow on a first batch of IC products among the plurality of IC products of the IC 100 for configuring the first temperature upper-limit UL1 of the specific functional block (e.g., the functional block 110_n) for the first batch of IC products, and more particularly, to determine (e.g., classify) the first batch of IC products as having the first power-ratio-related behavior (labeled "Device-A" for brevity), and configure the first temperature upper-limit UL1 of the specific functional block with respect to the thermal operation capability (e.g., TOC #5) of the specific functional block of the ICs {100} in the first batch of IC products in order to achieve the maximum performance of the first batch of IC products, and therefore, set the first temperature upper-limit UL1 of the specific functional block (e.g., the functional block 110_n) of any IC 100 (e.g., each IC 100) among the ICs {100} in the first batch of IC products as follows:

$$UL1 = \text{Target1};$$

where Target1 in the above equation may represent Target #1 shown in FIG. 12, and may be determined according to the curve corresponding to the first power-ratio-related behavior (labeled "Device-A" for brevity) as shown in FIG. 12, but the present invention is not limited thereto. In addition, the production tool of the IC 100 may be arranged to perform the functions or chip binning flow on a second batch of IC products among the plurality of IC products of the IC 100 for configuring the first temperature upper-limit UL1 of the specific functional block (e.g., the functional block 110_n) for the second batch of IC products, and more particularly, to determine (e.g., classify) the second batch of IC products as having the second power-ratio-related behavior (labeled "Device-B" for brevity), and configure the first temperature upper-limit UL1 of the specific functional block with respect to the thermal operation capability (e.g., TOC #5) of the specific functional block of the ICs {100} in the second batch of IC products in order to achieve the maximum performance of the second batch of IC products, and therefore, set the first temperature upper-limit UL1 of the specific functional block (e.g., the functional block 110_n) of any IC 100 (e.g., each IC 100) among the ICs {100} in the second batch of IC products as follows:

$$UL1 = \text{Target2};$$

where Target2 in the above equation may represent Target #2 shown in FIG. 12, and may be determined according to the curve corresponding to the second power-ratio-related behavior (labeled "Device-B" for brevity) as shown in FIG. 12, but the present invention is not limited thereto. In comparison with the related art, the specific functional block (e.g., the functional block 110_n) of the IC 100 (e.g., the functional block 110_n of any IC 100 among the ICs {100} in the first batch of IC products and the functional block 110_n of any IC 100 among the ICs {100} in the second batch of IC products) can operate correctly in various situations while achieving the maximum performance, where the first temperature upper-limit UL1 of the specific functional block can be configured with respect to the thermal operation capability (e.g., TOC #5) of the specific functional block, to make the first temperature upper-limit UL1 of the specific functional block be as high as possible. For brevity, similar descriptions for this embodiment are not repeated in detail here.

Figure 13:
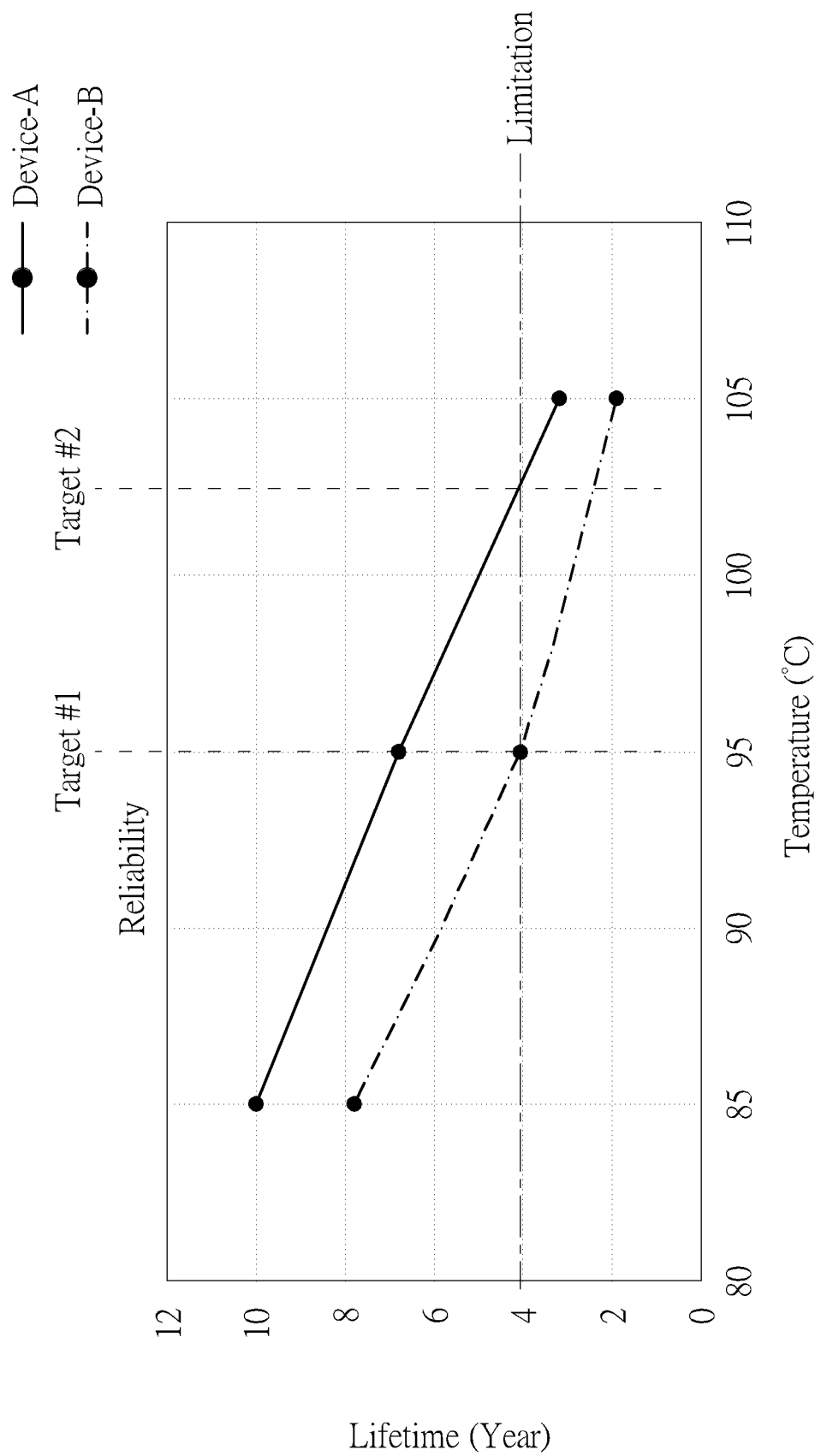
FIG. 13 is a diagram illustrating a thermal operation capability evaluation control scheme of the thermal control method according to a sixth embodiment of the present invention.

FIG. 13 is a diagram illustrating a thermal operation capability evaluation control scheme of the thermal control method according to a sixth embodiment of the present invention. For example, the aforementioned at least one per-functional-block thermal operation capability may comprise TOC #6 of the specific functional block (e.g., the functional block 110_n) of the IC 100, i.e., the reliability budget of the specific functional block (e.g., the functional block 110_n), such as the relationships between the lifetime and the temperature as shown in FIG. 13, where the horizontal axis may represent temperature and may be measured in unit of degrees Celsius (° C.), and the vertical axis may represent the lifetime and may be expressed in unit of year, but the present invention is not limited thereto. According to some embodiments, the associated units may vary. In addition, the two curves shown in FIG. 13 may correspond to different lifetime-related behaviors of the same functional block (e.g., the functional block 110_n) in different ICs {100}, such as a first lifetime-related behavior and a second lifetime-related behavior (labeled "Device-A" and "Device-B" for brevity), respectively, where the operating temperature may be limited by the reliability budget regarding the lifetime, and more particularly, may be limited in different manners for first samples of the first lifetime-related behavior and second samples of the second lifetime-related behavior, respectively. When a limitation such as a predetermined value (e.g., 4 years) on the vertical axis is determined in advance as shown in FIG. 13, different targets on the horizontal axis, such as Target #1 and Target #2 respectively corresponding to the second lifetime-related behavior and the first lifetime-related behavior (labeled "Device-B" and "Device-A" for brevity), can be determined according to the two curves shown in FIG. 13, respectively, for configuring the first temperature upper-limit UL1 of the specific functional block (e.g., the functional block 110_n) for different batches of IC products among the plurality of IC products of the IC 100, respectively.

For example, the production tool of the IC 100 may be arranged to perform the functions or chip binning flow on a first batch of IC products among the plurality of IC products of the IC 100 for configuring the first temperature upper-limit UL1 of the specific functional block (e.g., the functional block 110_n) for the first batch of IC products, and more particularly, to determine (e.g., classify) the first batch of IC products as having the first lifetime-related behavior (labeled "Device-A" for brevity), and configure the first temperature upper-limit UL1 of the specific functional block with respect to the thermal operation capability (e.g., TOC #6) of the specific functional block of the ICs {100} in the first batch of IC products in order to achieve the maximum performance of the first batch of IC products, and therefore, set the first temperature upper-limit UL1 of the specific functional block (e.g., the functional block 110_n) of any IC 100 (e.g., each IC 100) among the ICs {100} in the first batch of IC products as follows:

$$UL1 = \text{Target2};$$

where Target2 in the above equation may represent Target #2 shown in FIG. 13, and may be determined according to the curve corresponding to the first lifetime-related behavior (labeled "Device-A" for brevity) as shown in FIG. 13, but the present invention is not limited thereto. In addition, the production tool of the IC 100 may be arranged to perform the functions or chip binning flow on a second batch of IC products among the plurality of IC products of the IC 100 for configuring the first temperature upper-limit UL1 of the specific functional block (e.g., the functional block 110_n) for the second batch of IC products, and more particularly, to determine (e.g., classify) the second batch of IC products as having the second lifetime-related behavior (labeled "Device-B" for brevity), and configure the first temperature upper-limit UL1 of the specific functional block with respect to the thermal operation capability (e.g., TOC #6) of the specific functional block of the ICs {100} in the second batch of IC products in order to achieve the maximum performance of the second batch of IC products, and therefore, set the first temperature upper-limit UL1 of the specific functional block (e.g., the functional block 110_n) of any IC 100 (e.g., each IC 100) among the ICs {100} in the second batch of IC products as follows:

$$UL1 = \text{Target1};$$

where Target1 in the above equation may represent Target #1 shown in FIG. 13, and may be determined according to the curve corresponding to the second lifetime-related behavior (labeled "Device-B" for brevity) shown in FIG. 13, but the present invention is not limited thereto. In comparison with the related art, the specific functional block (e.g., the functional block 110_n) of the IC 100 (e.g., the functional block 110_n of any IC 100 among the ICs {100} in the first batch of IC products and the functional block 110_n of any IC 100 among the ICs {100} in the second batch of IC products) can operate correctly in various situations while achieving the maximum performance, where the first temperature upper-limit UL1 of the specific functional block can be configured with respect to the thermal operation capability (e.g., TOC #6) of the specific functional block, to make the first temperature upper-limit UL1 of the specific functional block be as high as possible. For brevity, similar descriptions for this embodiment are not repeated in detail here.

Figure 14:
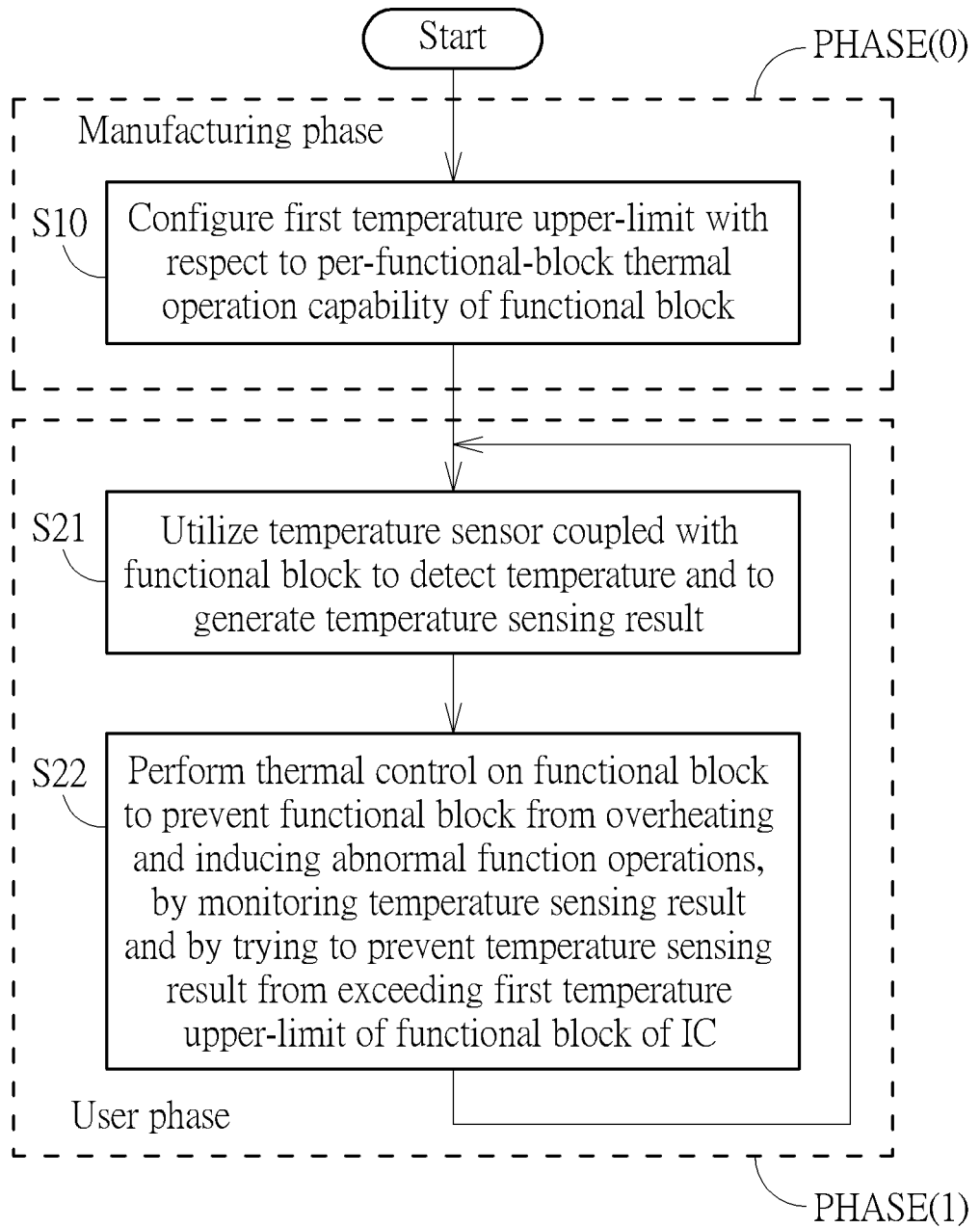
FIG. 14 illustrates a working flow of the thermal control method according to an embodiment of the present invention.

FIG. 14 illustrates a working flow of the thermal control method according to an embodiment of the present invention. The thermal control method can be applied to the IC 100, and the IC 100 can be configured to perform adaptive thermal ceiling control in the per-functional-block manner. According to the thermal control method, multiple phases such as the manufacturing phase PHASE(0) and the user phase PHASE(1) may comprise operations of Step S10 and Steps S21 and S22, respectively.

In Step S10, the aforementioned production tool of the IC 100 can configure the aforementioned at least one first temperature upper-limit UL1 with respect to the aforementioned at least one per-functional-block thermal operation capability of the aforementioned any functional block 110_n among the functional blocks 110_1, 110_2, . . . and 110_N within the IC 100. For example, under control of the production tool, the IC 100 (e.g., the functional block 110_1 such as the CPU) can store the aforementioned at least one first temperature upper-limit UL1 (or TOCs parameters for UL1 calculation) into a storage unit within the thermal control circuit 120, for being used in the user phase PHASE (1), but the present invention is not limited thereto. For another example, under control of the production tool, the IC 100 (e.g., the functional block 110_1 such as the CPU) can store the aforementioned at least one first temperature upper-limit UL1 (or TOCs parameters for UL1 calculation) into another storage unit (e.g., a non-volatile memory) that is integrated into the IC 100, for being loaded into the thermal control circuit 120 and used in the user phase PHASE(1). According to the thermal control method, the production tool of the IC 100 can be utilized to perform the functions or chip binning flow on the IC 100 to identify the aforementioned at least one per-functional-block thermal operation capability of the aforementioned any functional block 110_n among the functional blocks 110_1, 110_2, . . . and 110_N within the IC 100, for determining the aforementioned at least one first temperature upper-limit UL1 according to the aforementioned at least one per-functional-block thermal operation capability identified in the functions or chip binning flow.

In Step S21, the IC 100 can utilize at least one temperature sensor coupled with a first functional block (e.g., the functional block 110_n), such as the aforementioned at least one temperature sensor integrated with (e.g., next to or into) the specific functional block (e.g., the functional block 110_n) among the plurality of functional blocks (e.g., the functional blocks 110_1, 110_2, . . . and 110_N) of the IC 100, to detect temperature and to generate at least one temperature sensing result of the first functional block.

In Step S22, the IC 100 can perform thermal control on the plurality of functional blocks (e.g., the functional blocks 110_1, 110_2, . . . and 110_N), and more particularly, perform thermal control on the first functional block (e.g., the functional block 110_n) to prevent the first functional block from overheating and inducing abnormal function operations, by monitoring the aforementioned at least one temperature sensing result of the first functional block and by trying to prevent the at least one temperature sensing result of the first functional block from exceeding the first temperature upper-limit UL1 of the first functional block of the IC 100, where the first temperature upper-limit UL1 of the first functional block (e.g., the functional block 110_n) is configurable with respect to at least one per-functional-block thermal operation capability of the first functional block, such as the aforementioned at least one per-functional-block thermal operation capability of the aforementioned any functional block 110_n among the functional blocks 110_1, 110_2, . . . and 110_N within the IC 100. Please note that the functional block count N of the functional blocks 110_1, 110_2, . . . and 110_N may be greater than or equal to one. For example, when the functional block count N is equal to one, the first functional block such as the aforementioned any functional block 110_n may represent the functional block 110_1 (e.g., the CPU), but the present invention is not limited thereto.

As shown in FIG. 14, Step S10 can be executed in the manufacturing phase PHASE(0), such as the phase of mass production, and Steps S21 and S22 can be executed in the user phase PHASE(1) of the IC 100, such as the phase that the user can use the electronic device 300 after obtaining the electronic device 300. For brevity, similar descriptions for this embodiment are not repeated in detail here.

For better comprehension, the method may be illustrated with the working flow shown in FIG. 14, but the present invention is not limited thereto. According to some embodiments, one or more steps may be added, deleted, or changed in the working flow shown in FIG. 14.

According to some embodiments, the IC 100 may comprise the plurality of functional blocks such as the functional blocks 110_1, 110_2, . . . and 110_N, and the first functional block is a functional block (e.g., the functional block 110_n) among the plurality of functional blocks (e.g., the functional blocks 110_1, 110_2, . . . and 110_N), where a plurality of temperature sensors may be coupled with (e.g., integrated with) the plurality of functional blocks to detect temperature and to generate a plurality of temperature sensing results of the plurality of functional blocks, respectively. In addition, the aforementioned at least one thermal control circuit such as the thermal control circuit 120 may be arranged to perform thermal control on the plurality of functional blocks (e.g., the functional blocks 110_1, 110_2, . . . and 110_N) to prevent the plurality of functional blocks from overheating and inducing abnormal function operations, by monitoring the plurality of temperature sensing results of the plurality of functional blocks (e.g., the respective temperature sensing results of the functional blocks 110_1, 110_2, . . . and 110_N) and by trying to prevent the plurality of temperature sensing results of the plurality of functional blocks from exceeding a plurality of first temperature upper-limits of the plurality of functional blocks, such as the first temperature upper-limits UL1_1, UL1_2, . . . and UL1_N corresponding to the functional blocks 110_1, 110_2, . . . and 110_N among the plurality of first temperature upper-limits {UL1}, in the time interval between the beginning time point of boot-up of the IC 100 and the end time point of shutdown of the IC 100, respectively, where the first temperature upper-limit UL1 of the first functional block (e.g., the functional block 110_n) is one of the plurality of first temperature upper-limits {UL1}.

According to some embodiments, the aforementioned at least one thermal control circuit such as the thermal control circuit 120 may be implemented by way of software running on the first functional block (e.g., the functional block 110_n). For brevity, similar descriptions for this embodiment are not repeated in detail here.

According to some embodiments, the aforementioned at least one first temperature upper-limit UL1 of the aforementioned at least one functional block (e.g., the functional block 110_n) can be implemented as the aforementioned at least one first chip-level temperature upper-limit UL1(1). For example, the aforementioned at least one thermal control circuit such as the thermal control circuit 120 can be arranged to determine the aforementioned at least one first chip-level temperature upper-limit UL1(1) according to at least one first functional-block-level temperature upper-limit UL1(0) (e.g., one or more first functional-block-level temperature upper-limits {UL1(0)}) such as the plurality of first temperature upper-limits {UL1} of the IC 100, where the plurality of first temperature upper-limits {UL1} may represent the plurality of thermal ceiling target values (e.g., the first temperature upper-limits UL1_1, UL1_2, . . . and UL1_N) of the functional blocks 110_1, 110_2, . . . and 110_N for preventing the functional blocks 110_1, 110_2, . . . and 110_N from overheating, respectively. In addition, the aforementioned at least one first chip-level temperature upper-limit UL1(1) can be equal to the minimum of the aforementioned at least one first functional-block-level temperature upper-limit UL1(0) (e.g., the one or more first functional-block-level temperature upper-limits {UL1(0)}), such as the minimum of the plurality of first temperature upper-limits {UL1} (e.g., the first temperature upper-limits UL1_1, UL1_2, . . . and UL1_N) of the IC 100, but the present invention is not limited thereto. For brevity, similar descriptions for these embodiments are not repeated in detail here.

According to some embodiments, the thermal control method is further applicable to the main circuit 200 comprising the IC 100, where the aforementioned at least one first temperature upper-limit UL1 of the aforementioned at least one functional block (e.g., the functional block 110_n) can be the aforementioned at least one first chip-level temperature upper-limit UL1(1). In addition, the thermal control method may further comprise:

(1) utilizing the plurality of board-level temperature sensors such as the board-level temperature sensors 210_1, 210_2, 210_3 and 210_4 to perform temperature sensing within the main circuit 200 to generate the respective temperature sensing results of the ICs 100, 220, 230 and 240 within the main circuit 200; and (2) utilizing the aforementioned at least one thermal control circuit such as the thermal control circuit 120 to perform thermal control on the ICs 100, 220, 230 and 240 to prevent the ICs 100, 220, 230 and 240 IC from overheating and inducing abnormal function operations, by monitoring the respective temperature sensing results of the ICs 100, 220, 230 and 240 and by trying to prevent the respective temperature sensing results of the ICs 100, 220, 230 and 240 from exceeding the aforementioned at least one first board-level temperature upper-limit UL1(2) of the main circuit 200;

where the aforementioned at least one first board-level temperature upper-limit UL1(2) is configurable with respect to the aforementioned at least one per-board thermal operation capability of the main circuit 200, but the present invention is not limited thereto. For brevity, similar descriptions for these embodiments are not repeated in detail here.

According to some embodiments, the thermal control method is further applicable to the electronic device 300 comprising the main circuit 200, where the main circuit 200 is the main component of the electronic device 300. In addition, the thermal control method may further comprise: (1) utilizing the plurality of device-level temperature sensors such as the device-level temperature sensors 310_1, 310_2, 310_3, 310_4, 310_5 and 310_6 to perform temperature sensing within the electronic device 300 to generate the respective temperature sensing results of the main circuit 200 and the secondary components 320, 330, 340, 350 and 360 within the electronic device 300; and (2) utilizing the aforementioned at least one thermal control circuit such as the thermal control circuit 120 to perform thermal control on the main circuit 200 and the secondary components 320, 330, 340, 350 and 360 to prevent the main circuit 200 and the secondary components 320, 330, 340, 350 and 360 from overheating and inducing abnormal function operations, by monitoring the respective temperature sensing results of the main circuit 200 and the secondary components 320, 330, 340, 350 and 360 and by trying to prevent the respective temperature sensing results of the main circuit 200 and the secondary components 320, 330, 340, 350 and 360 from exceeding the aforementioned at least one first device-level temperature upper-limit UL1(3) of the electronic device 300; where the aforementioned at least one first device-level temperature upper-limit UL1(3) is configurable with respect to the aforementioned at least one per-device thermal operation capability of the electronic device 300, but the present invention is not limited thereto. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit (IC), configurable to perform adaptive thermal ceiling control in a per-functional-block manner, the IC comprising:
   a plurality of hardware circuits, arranged to perform operations of a first functional block, wherein at least one temperature sensor is coupled with the first functional block to detect temperature and to generate at least one temperature sensing result of the first functional block; and
   at least one thermal control circuit, coupled to the first functional block, arranged to perform thermal control on the first functional block to prevent the first functional block from overheating and inducing abnormal function operations, by monitoring the at least one temperature sensing result of the first functional block and by trying to prevent the at least one temperature sensing result from exceeding a first temperature upper-limit of the first functional block of the IC, wherein the first temperature upper-limit is configurable with respect to at least one per-functional-block thermal operation capability of the first functional block;
   wherein a maximum value of a predetermined temperature region within which the first temperature upper-limit is configured is less than a second temperature upper-limit of the first functional block of the IC; the second temperature upper-limit is determined according to a first per-functional-block thermal-sensor-related feature, to make a temperature region between the second temperature upper-limit and a third temperature upper-limit of the first functional block of the IC correspond to the first per-functional-block thermal-sensor-related feature, wherein the third temperature upper-limit is greater than the second temperature upper-limit, and represents a temperature upper-limit without considering the first per-functional-block thermal-sensor-related feature; and
   wherein the third temperature upper-limit is determined according to a second per-functional-block thermal-sensor-related feature, to make a temperature region between the third temperature upper-limit and a fourth temperature upper-limit of the first functional block of the IC correspond to the second per-functional-block thermal-sensor-related feature, wherein the fourth temperature upper-limit is greater than the third temperature upper-limit, and represents a temperature upper-limit without considering the second per-functional-block thermal-sensor-related feature.

2. The IC of claim 1, wherein the IC comprises a plurality of functional blocks, and the first functional block is a functional block among the plurality of functional blocks, wherein a plurality of temperature sensors are coupled with the plurality of functional blocks to detect temperature and to generate a plurality of temperature sensing results of the plurality of functional blocks, respectively; and the at least one thermal control circuit is arranged to perform thermal control on the plurality of functional blocks to prevent the plurality of functional blocks from overheating and inducing abnormal function operations, by monitoring the plurality of temperature sensing results of the plurality of functional blocks and by trying to prevent the plurality of temperature sensing results of the plurality of functional blocks from exceeding a plurality of first temperature upper-limits of the plurality of functional blocks in a time interval between a beginning time point of boot-up of the IC and an end time point of shutdown of the IC, respectively, wherein the first temperature upper-limit is one of the plurality of first temperature upper-limits.

3. The IC of claim 1, wherein the at least one per-functional-block thermal operation capability comprises a power-to-thermal efficiency of the first functional block of the IC.

4. The IC of claim 1, wherein the at least one per-functional-block thermal operation capability comprises a maximum voltage budget of the first functional block of the IC.

5. The IC of claim 1, wherein the at least one per-functional-block thermal operation capability comprises a maximum power budget of the first functional block of the IC.

6. The IC of claim 1, wherein the at least one per-functional-block thermal operation capability comprises a thermal control efficiency of the first functional block of the IC.

7. The IC of claim 1, wherein the at least one per-functional-block thermal operation capability comprises an operation power efficiency regarding temperature level of the first functional block of the IC.

8. The IC of claim 1, wherein the at least one per-functional-block thermal operation capability comprises a reliability budget of the first functional block of the IC.

9. The IC of claim 1, wherein the first temperature upper-limit is configured as an adaptive thermal ceiling point within the predetermined temperature region according to the at least one per-functional-block thermal operation capability.

10. The IC of claim 9, wherein the first per-functional-block thermal-sensor-related feature represents per-functional-block thermal-sensor detection tolerance, the per-functional-block thermal-sensor detection tolerance related to positioning the at least one temperature sensor integrated with the first functional block, wherein regarding the per-functional-block thermal-sensor detection tolerance, the closer the sensor to the functional block, a detected temperature value would be more accurate and, thus has a lower tolerance.

11. The IC of claim 9, wherein the first per-functional-block thermal-sensor-related feature represents per-functional-block thermal sensor accuracy, the per-functional-block thermal sensor accuracy related to at least one temperature-sensing accuracy of the at least one temperature sensor integrated with the first functional block.

12. The IC of claim 9, wherein the first per-functional-block thermal-sensor-related feature represents per-functional-block thermal-sensor detection tolerance, the per-functional-block thermal-sensor detection tolerance related to positioning the at least one temperature sensor integrated with the first functional block;
and the second per-functional-block thermal-sensor-related feature represents per-functional-block thermal sensor accuracy, the per-functional-block thermal sensor accuracy related to at least one temperature-sensing accuracy of the at least one temperature sensor integrated with the first functional block.

13. The IC of claim 9, wherein the first per-functional-block thermal-sensor-related feature represents per-functional-block thermal sensor accuracy, the per-functional-block thermal sensor accuracy related to at least one temperature-sensing accuracy of the at least one temperature sensor integrated with the first functional block; and the second per-functional-block thermal-sensor-related feature represents per-functional-block thermal-sensor detection tolerance, the per-functional-block thermal-sensor detection tolerance related to positioning the at least one temperature sensor integrated with the first functional block.

14. The IC of claim 9, wherein the fourth temperature upper-limit is a strictly forbidden upper-limit defined by the fabrication conditions which provided by a fabricator of the IC.

15. The IC of claim 9, wherein a per-functional-block thermal-sensor-related feature among the first per-functional-block thermal-sensor-related feature and the second per-functional-block thermal-sensor-related feature represents per-functional-block thermal sensor accuracy, the per-functional-block thermal sensor accuracy related to at least one temperature-sensing accuracy of the at least one temperature sensor integrated with the first functional block; the IC comprises a plurality of functional blocks, and the first functional block is a functional block among the plurality of functional blocks; and the at least one temperature-sensing accuracy comprises at least one portion of temperature-sensing accuracies among respective temperature-sensing accuracies of respective temperature sensors of the plurality of functional blocks.

16. The IC of claim 15, wherein the at least one temperature-sensing accuracy comprises an average temperature-sensing accuracy of the respective temperature-sensing accuracies of the respective temperature sensors of the plurality of functional blocks.

17. The IC of claim 15, wherein the at least one temperature-sensing accuracy comprises a statistic temperature-sensing accuracy of the respective temperature-sensing accuracies of the respective temperature sensors of the plurality of functional blocks.

18. The IC of claim 15, wherein the at least one temperature-sensing accuracy comprises a worst temperature-sensing accuracy of the respective temperature-sensing accuracies of the respective temperature sensors of the plurality of functional blocks.

19. The IC of claim 1, wherein a production tool of the IC is arranged to perform a functions or chip binning flow on the IC to identify the at least one per-functional-block thermal operation capability of the first functional block within the IC; and the first temperature upper-limit is determined according to the at least one per-functional-block thermal operation capability identified in the functions or chip binning flow.

20. The IC of claim 1, wherein the at least one thermal control circuit is implemented by way of hardware, software running on the first functional block, or at least one hybrid module of hardware and software.

21. A main circuit comprising the IC of claim 1, wherein the first temperature upper-limit is a first chip-level temperature upper-limit; and the main circuit further comprises:
at least one other IC, arranged to perform at least one other operation for the IC; and
a plurality of board-level temperature sensors, arranged to perform temperature sensing within the main circuit to generate respective temperature sensing results of the IC and the at least one other IC;
wherein the at least one thermal control circuit is arranged to perform thermal control on the IC and the at least one other IC to prevent the IC and the at least one other IC from overheating and inducing abnormal function operations, by monitoring the respective temperature sensing results of the IC and the at least one other IC and by trying to prevent the respective temperature sensing results of the IC and the at least one other IC from exceeding at least one first board-level temperature upper-limit of the main circuit, wherein the at least one first board-level temperature upper-limit is configurable with respect to at least one per-board thermal operation capability of the main circuit.

22. An electronic device comprising the main circuit of claim 21, wherein the main circuit is a main component of the electronic device; and the electronic device further comprises:
at least one secondary component, arranged to operate under control of the main circuit; and
a plurality of device-level temperature sensors, arranged to perform temperature sensing within the electronic device to generate respective temperature sensing results of the main circuit and the at least one secondary component;
wherein the at least one thermal control circuit is arranged to perform thermal control on the main circuit and the at least one secondary component to prevent the main circuit and the at least one secondary component from overheating and inducing abnormal function operations, by monitoring the respective temperature sensing results of the main circuit and the at least one secondary component and by trying to prevent the respective temperature sensing results of the main circuit and the at least one secondary component from exceeding at least one first device-level temperature upper-limit of the electronic device, wherein the at least one first device-level temperature upper-limit is configurable with respect to at least one per-device thermal operation capability of the electronic device.

23. A thermal control method, applicable to at least one functional block of an integrated circuit (IC), the at least one functional block being configurable to perform adaptive thermal ceiling control in a per-functional-block manner, the thermal control method comprising:
utilizing at least one temperature sensor coupled with a first functional block of the at least one functional block of the IC to detect temperature and to generate at least one temperature sensing result of the first functional block; and
performing thermal control on the first functional block to prevent the first functional block from overheating and inducing abnormal function operations, by monitoring the at least one temperature sensing result of the first functional block and by trying to prevent the at least one temperature sensing result from exceeding a first temperature upper-limit of the first functional block of the IC, wherein the first temperature upper-limit is configurable with respect to at least one per-functional-block thermal operation capability of the first functional block;
wherein a maximum value of a predetermined temperature region within which the first temperature upper-limit is configured is less than a second temperature upper-limit of the first functional block of the IC; the second temperature upper-limit is determined according to a first per-functional-block thermal-sensor-related feature, to make a temperature region between the second temperature upper-limit and a third temperature upper-limit of the first functional block of the IC correspond to the first per-functional-block thermal-sensor-related feature, wherein the third temperature upper-limit is greater than the second temperature upper-limit, and represents a temperature upper-limit without considering the first per-functional-block thermal-sensor-related feature; and
wherein the third temperature upper-limit is determined according to a second per-functional-block thermal-sensor-related feature, to make a temperature region between the third temperature upper-limit and a fourth temperature upper-limit of the first functional block of the IC correspond to the second per-functional-block thermal-sensor-related feature, wherein the fourth temperature upper-limit is greater than the third temperature upper-limit, and represents a temperature upper-limit without considering the second per-functional-block thermal-sensor-related feature.

24. The thermal control method of claim 23, wherein the step of utilizing the at least one temperature sensor coupled with the first functional block of the at least one functional block of the IC to detect the temperature and to generate the at least one temperature sensing result of the first functional block and the step of performing the thermal control on the first functional block to prevent the first functional block from overheating and inducing the abnormal function operations by monitoring the at least one temperature sensing result of the first functional block and by trying to prevent the at least one temperature sensing result from exceeding the first temperature upper-limit of the first functional block of the IC are executed in a user phase of the IC; and the thermal control method further comprises:
utilizing a production tool of the IC to perform a functions or chip binning flow on the IC to identify the at least one per-functional-block thermal operation capability of the first functional block within the IC, for determining the first temperature upper-limit according to the at least one per-functional-block thermal operation capability identified in the functions or chip binning flow.

25. The thermal control method of claim 23, wherein the thermal control method is further applicable to a main circuit comprising the IC, wherein the first temperature upper-limit is a first chip-level temperature upper-limit; and the thermal control method further comprises:
utilizing a plurality of board-level temperature sensors to perform temperature sensing within the main circuit to generate respective temperature sensing results of the IC and at least one other IC within the main circuit; and
performing thermal control on the IC and the at least one other IC to prevent the IC and the at least one other IC from overheating and inducing abnormal function operations, by monitoring the respective temperature sensing results of the IC and the at least one other IC and by trying to prevent the respective temperature sensing results of the IC and the at least one other IC from exceeding at least one first board-level temperature upper-limit of the main circuit, wherein the at least one first board-level temperature upper-limit is configurable with respect to at least one per-board thermal operation capability of the main circuit.

26. The thermal control method of claim 25, wherein the thermal control method is further applicable to an electronic device comprising the main circuit, wherein the main circuit is a main component of the electronic device; and the thermal control method further comprises:
utilizing a plurality of device-level temperature sensors to perform temperature sensing within the electronic device to generate respective temperature sensing results of the main circuit and at least one secondary component within the electronic device; and
performing thermal control on the main circuit and the at least one secondary component to prevent the main circuit and the at least one secondary component from overheating and inducing abnormal function operations, by monitoring the respective temperature sensing results of the main circuit and the at least one secondary component and by trying to prevent the respective temperature sensing results of the main circuit and the at least one secondary component from exceeding at least one first device-level temperature upper-limit of the electronic device, wherein the at least one first device-level temperature upper-limit is configurable with respect to at least one per-device thermal operation capability of the electronic device.

* * * * *